(12) United States Patent
Curt et al.

(10) Patent No.: US 7,881,907 B2
(45) Date of Patent: *Feb. 1, 2011

(54) SYSTEM AND METHOD FOR PROVIDING REMOTE MONITORING OF VOLTAGE POWER TRANSMISSION AND DISTRIBUTION DEVICES

(75) Inventors: Walter Curt, Harrisonburg, VA (US); Chris Mullins, Harrisonburg, VA (US); Glen Shomo, Harrisonburg, VA (US); Wayne Bruffy, Mount Crawford, VA (US)

(73) Assignee: Power Monitors, Inc., Mt. Crawford, VA (US)

( * ) Notice: Subject to any disclaimer, the term of this patent is extended or adjusted under 35 U.S.C. 154(b) by 461 days.

This patent is subject to a terminal disclaimer.

(21) Appl. No.: 10/920,460

(22) Filed: Aug. 18, 2004

(65) Prior Publication Data

US 2005/0235174 A1 Oct. 20, 2005

Related U.S. Application Data

(60) Provisional application No. 60/496,205, filed on Aug. 18, 2003.

(51) Int. Cl.
*G06F 19/00* (2006.01)

(52) U.S. Cl. .......................... 702/188; 702/57; 702/61; 702/198; 700/286; 700/295; 713/300

(58) Field of Classification Search .................. 702/188, 702/61, 62, 176, 64, 57, 198; 700/295, 286; 713/300; 340/660, 661; 324/113

See application file for complete search history.

(56) References Cited

U.S. PATENT DOCUMENTS

| | | | | |
|---|---|---|---|---|
| 6,360,177 | B1 * | 3/2002 | Curt et al. | 702/64 |
| 6,792,337 | B2 * | 9/2004 | Blackett et al. | 700/295 |
| 6,957,158 | B1 * | 10/2005 | Hancock et al. | 702/61 |
| 2004/0138786 | A1 * | 7/2004 | Blackett et al. | 700/295 |
| 2004/0138835 | A1 * | 7/2004 | Ransom et al. | 702/62 |
| 2005/0138432 | A1 * | 6/2005 | Ransom et al. | 713/201 |

* cited by examiner

*Primary Examiner*—Drew A Dunn
*Assistant Examiner*—Hien X Vo
(74) *Attorney, Agent, or Firm*—K&L Gates LLP

(57) ABSTRACT

The present invention provides a system and method for providing remote monitoring of a power device or power delivery system. In architecture, the system includes a remote device for performing the operation. The remote device comprises a power condition detection circuitry and a memory circuitry that stores information describing the power condition of the power device. Moreover, the remote device further comprises a transmission circuitry that transmits the information of the power condition to the service device for analysis. The present invention can also be viewed as a method for providing remote monitoring of a power device. The method operates by (1) detecting a power condition of the power device; (2) storing information describing the power condition of the power device; and (3) transmitting the information of the power condition to the service device for analysis.

43 Claims, 26 Drawing Sheets

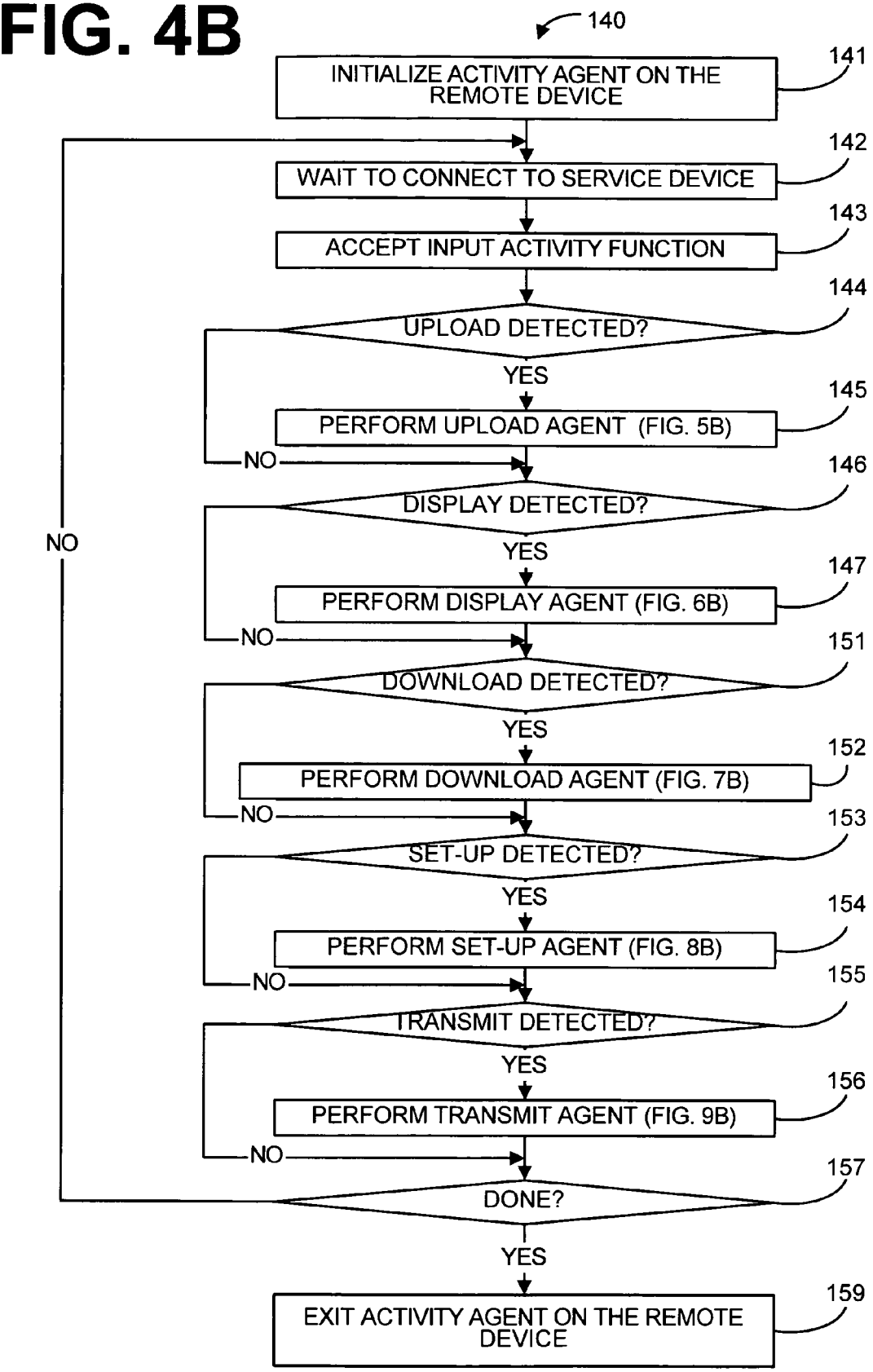

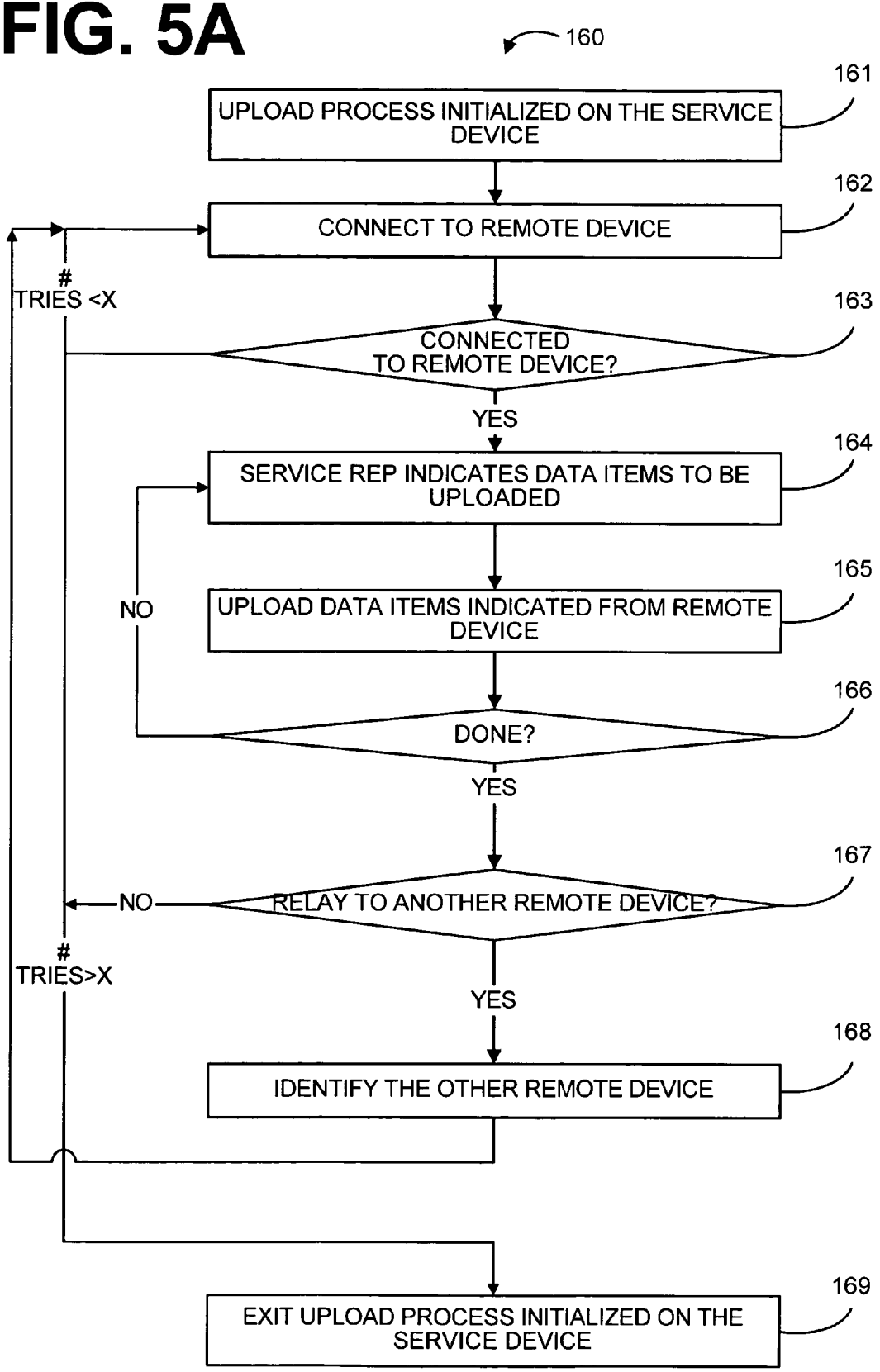

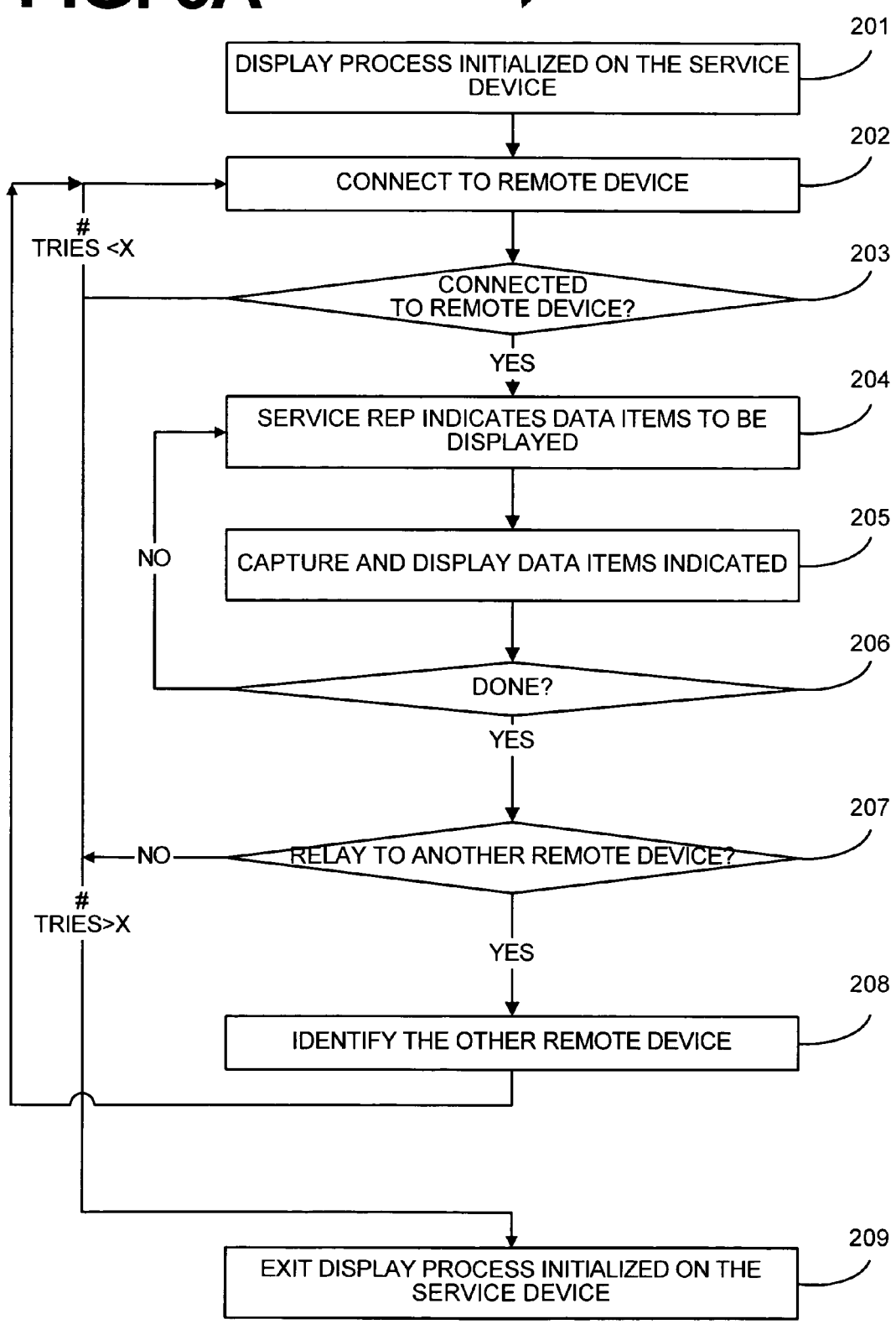

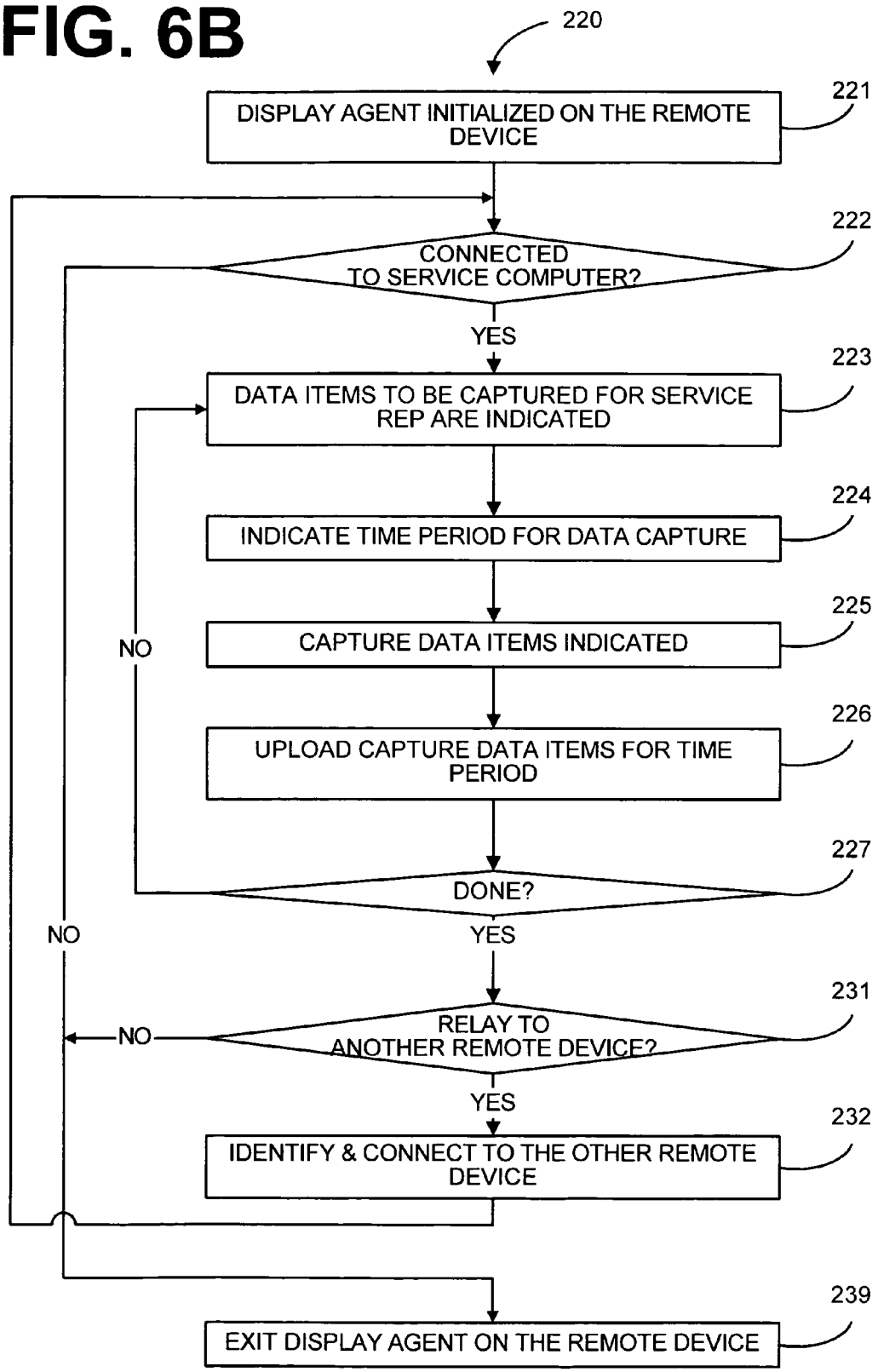

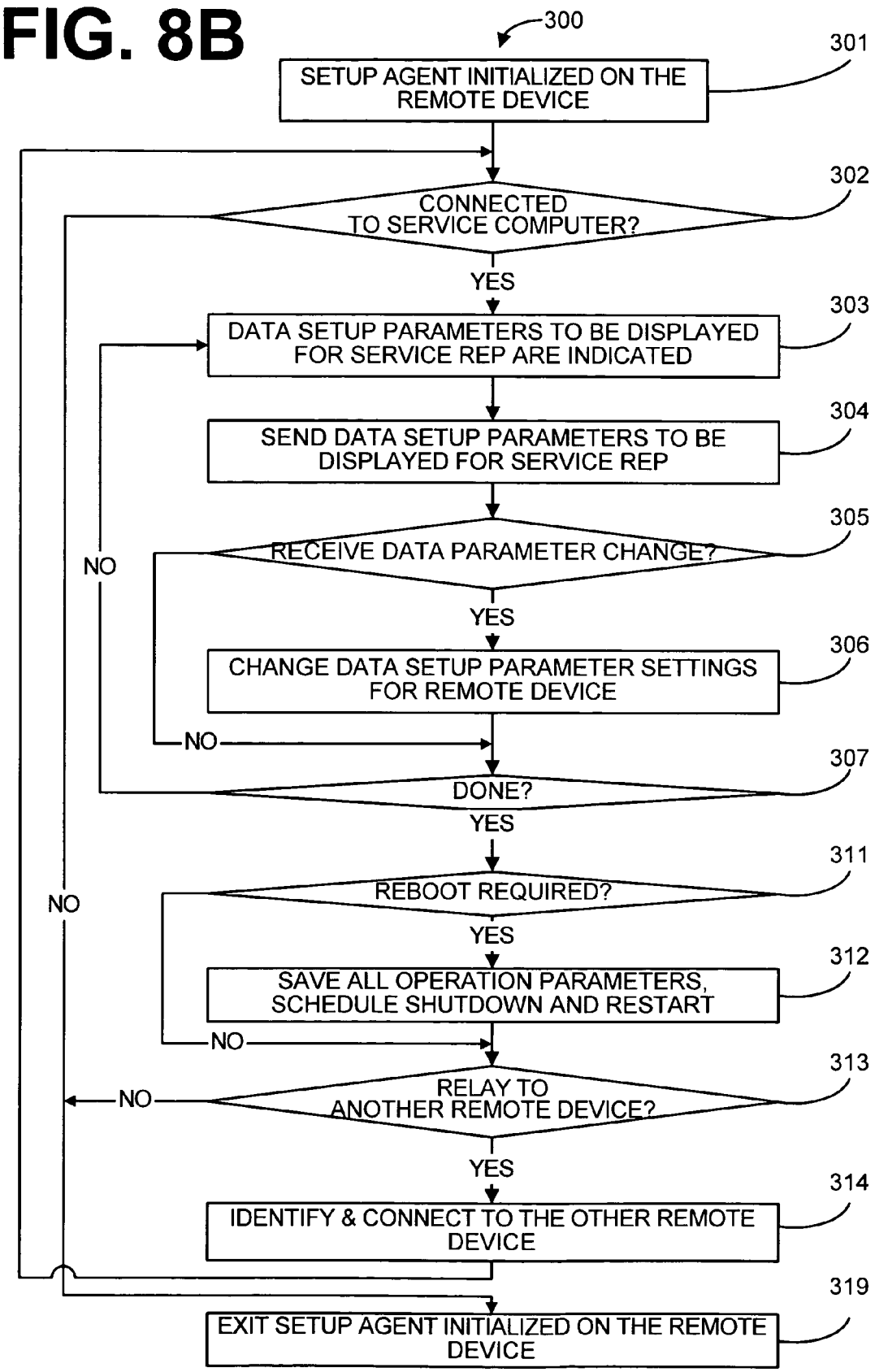

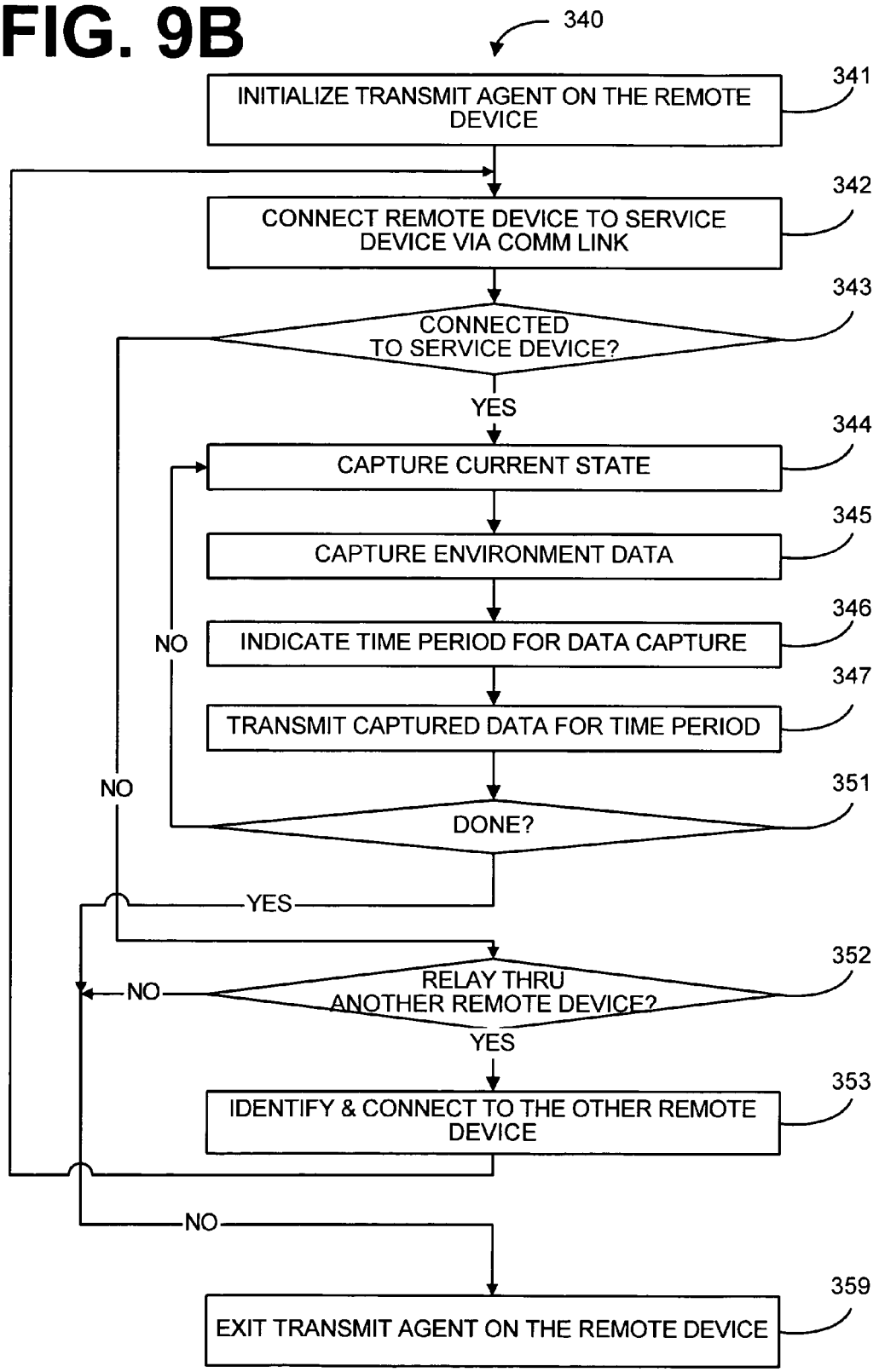

SYSTEM AND METHOD FOR PROVIDING REMOTE MONITORING OF VOLTAGE POWER TRANSMISSION AND DISTRIBUTION DEVICES

CROSS-REFERENCE TO RELATED APPLICATIONS

This application claims the benefit of U.S. Patent Application Ser. No. 60/496,205, filed on Aug. 18, 2003, entitled "A SYSTEM AND METHOD FOR PROVIDING REMOTE MONITORING OF VOLTAGE POWER TRANSMISSION AND DISTRIBUTION DEVICES", which is incorporated by reference herein in its entirety.

COPYRIGHT NOTICE

A portion of the disclosure of this patent document may contain material, which is subject to copyright protection. The copyright owner has no objection to the facsimile reproduction by anyone of the patent document or patent disclosure as it appears in the U.S. Patent and Trademark Office patent file or records, but otherwise reserves all copyright rights whatsoever.

TECHNICAL FIELD

The present invention relates to a method and system for maintaining operation of voltage power transmission devices, and more particularly, relates to a method and system for providing remote monitoring of a voltage power transmission and distribution devices.

BACKGROUND OF THE INVENTION

Conventional voltage, current and power analyzers have required many connections to a physically large recording box. Typically, access is required to an electrical panel or transformer case where the connections to the analyzer equipment can be made. In addition, physical access to the analyzer is required to view real-time measurements and status, as well as to extract recorded data.

For instance, often a communications cable and power cable are also required. This creates serious safety concerns for both the technician user, and for the manufacturer. The need to attach the communication and power cables to the analyzer generally requires the technician to be in close proximity with the analyzer.

Safety issues include proximity to hazardous high voltages, technician exposure to confined locations (e.g. underground vaults), explosive atmospheres, etc. Frequently high voltage electrical power to the power system device being monitored must be removed before a technician is allowed to enter a confined area where a power analyzer may be located. Since this may disrupt electrical service to a large area, this is often impractical.

In addition, the large size of existing recorders, and the necessity for physical access to it later, can make it difficult to enclose and lock such conventional analyzing equipment in an electrical panel or transformer case. The result is that the panel or transformer cover must be left off during an analyzing recording session. Obviously, this creates unsafe conditions by putting the technician and others at great risk of electrocution.

Also, safe voltage isolation has been difficult to achieve in a small recorder when all voltage channels are to be brought into a single recorder unit. This is extremely difficult to achieve at voltages as high as 600 Volts. This is particularly important in any instrument designed for field use such as on a utility pole.

Thus, heretofore an unaddressed need exists in the industry to address the aforementioned deficiencies quickly and efficiently.

SUMMARY OF THE INVENTION

The present invention provides a system and method for providing remote monitoring of a power device or power delivery system.

In architecture, the system includes a remote device for performing the operation. The remote device comprises a power condition detection circuitry and a memory circuitry that stores information describing the power condition of the power device. Moreover, the remote device further comprises a transmission circuitry that transmits the information of the power condition to the service device for analysis.

The present invention can also be viewed as a method for providing remote monitoring of a power device. The method operates by (1) detecting a power condition of the power device; (2) storing information describing the power condition of the power device or system; and (3) transmitting the information of the power condition to the service device for analysis.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

FIG. 4B is a flow chart illustrating an example of the operation of the activity agent on the remote monitoring device used in conjunction with the remote power monitoring system of the present invention, as shown in FIGS. 2B, 2C, 3A, 3B, and 4A.

FIG. 5A is a flow chart illustrating an example of the operation of the upload process utilized by the remote power monitoring system of the present invention, as shown in FIGS. 2A, 3A and 4A.

FIG. 6A is a flow chart illustrating an example of the operation of the display process utilized by the remote power monitoring system of the present invention, as shown in FIGS. 2A, 3A and 4A.

FIG. 6B is a flow chart illustrating an example of the operation of the display agent utilized in the remote monitoring device and utilized by the remote power monitoring system of the present invention, as shown in FIGS. 2B, 3B, 3C and 4B.

FIG. 8B is a flow chart illustrating an example of the operation of the set-up agent utilized in the remote monitoring device and utilized by the remote power monitoring system of the present invention, as shown in FIGS. 2B, 3B, 3C and 4B.

FIG. 9B is a flow chart illustrating an example of the operation of the network transmit agent utilized in the remote monitoring device and utilized by the remote power monitoring system of the present invention, as shown in FIGS. 2B, 3B, 3C and 4B.

DETAILED DESCRIPTION OF THE PREFERRED EMBODIMENTS

Figure 1:
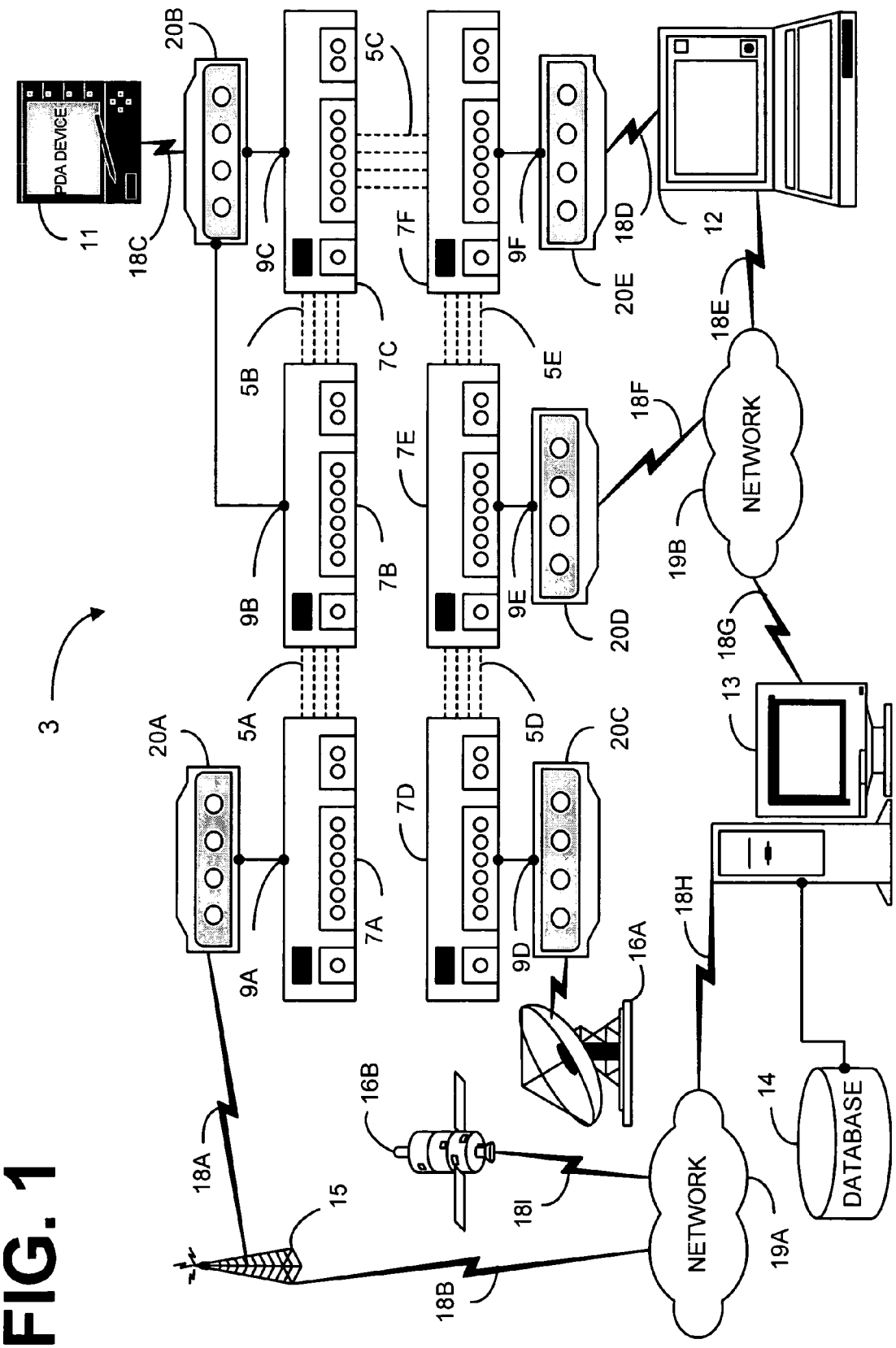
FIG. 1 is a block diagram illustrating an example of the network environment for a service system and the remote monitoring devices utilizing the remote power monitoring system of the present invention.

The present invention solves many problems, while it delivers accuracy and provides the user with much greater flexibility over conventional arrangements. The present invention relates to power analyzers for use in the field in monitoring power transmission and distribution systems.

In particular, the present invention relates to a small, wireless, remote power monitoring system. The remote power monitoring system is capable of independently sensing and recording voltage and current conditions, including but not limited to performance conditions and external environmental conditions. The remote power monitoring system performing in a larger system collects, and records voltage and current conditions detected by one or more transducers in accordance with the invention. These larger systems, include but are not limited to, network protectors, circuit breakers, electrical panels, transformers, reclosers, capacitor banks, fuses, transfer switches, voltage regulators, VAR compensators, and the like. In particular, the remote power monitoring system may be embedded into or attached or retrofitted to a device (e.g. a circuit breaker or network protector), thus creating an integrated device.

The remote power monitoring system of the present invention comprises circuitry and external leads. The external leads connect to the voltage to be recorded, and the transducers clamp around the conductor of the voltage or use other means to convert the current flow into a suitable input signal. The circuitry is generally contained within a unitary casing, however, an external clamp portion can be utilized to incorporate signal conditioning circuitry. The remote monitoring device contains all analog and digital circuitry necessary to digitize voltage and current waveform data collected from the conductor, transducer and the external leads. From such data, all power quality parameters such as RMS voltage, current, power, power factor, harmonics, and the like can be computed. The data is stored in digital memory located on a circuit board in the remote monitoring device. To provide this information to the analyzing device, the remote monitoring device of the present invention utilizes communication technology.

A remote power monitoring system in accordance with the invention includes a recording unit with a RF transceiver. The remote power monitoring system of the present invention preferably uses a low-power wireless transceiver, for example but not limited to, a transceiver equipped with a Bluetooth system. Other types of communication technologies may be utilized including, but not limited to, WiFi, cellular, optical, satellite, RF, conventional telephone system, Ethernet, LAN, WAN or the like. This transceiver allows the engineer or technician to use a separate display device, such as for example, a Bluetooth-enabled personal digital assistant (PDA), to view real-time waveforms and data, and to download recorded data from the transducer into the PDA for later analysis.

In addition, the remote power monitoring system in accordance with the invention can control other equipment both by initiating control signals through an optical, wired or wireless port, and relaying control signals received through the optical, wired or wireless interface, through a port attached to the equipment. This allows the user to use existing or new software to control their equipment, without modification, and without having to enter a confined space, voltage area, or other hazardous or inaccessible location.

The remote power monitoring system of the present invention is a measurement and recording system which measures and records power quality, power flow parameters and statistics. It can also transmit real-time and previously recorded data through an optical, wired or wireless interface to allow safe access to the data, where it was previously impracticable to acquire such data. In addition, it can control other equipment both by initiating control signals through an optical, wired or wireless port, and relaying control signals received through the optical, wired or wireless interface, through a port to attached equipment. A handheld computer, laptop, PDA, Pocket PC or other like device may be used to communicate with the remote power monitoring system. The remote power monitoring system can record data for several years, depending on the user setup.

The measurement and recording aspect of the invention is based on conventional methods, such as the Vip power analyzer, and the VP-2 available from Power Monitors, Inc. The data measured and recorded includes, but is not limited to: (for single and multiple phase power transmission and distribution equipment) RMS voltage and current, real power, apparent power, harmonics, phase angle, reactive power, power factors, displaced power factor, total harmonic distortion, total power quantities, total real power, total reactive power, total apparent power, total power factors, phase angles, cycle histograms, cycle event changes, flicker, abnormal voltages and power outages; (for remote power monitoring system) parameters, log, current status, set-up parameters, sensor data and the like, and (for environmental conditions) temperature, humidity, air pressure, smoke (i.e. smoke detector), security status, and the like. For example, standards such as IEC 61000-4-30, IEC 61000-4-7, IEC 61000-4-15 may also be used as measurement techniques, and EN 50160 IEEE 1159 and 519 to characterize voltage events and power quality.

The remote power monitoring system of the present invention preferably includes a wireless interface. The compact size of the remote power monitoring system of the present invention allows these conventional measurements and recordings to be acquired in situations that were unsafe or impossible with existing designs. The wireless aspect provides voltage isolation, protecting the user from hazardous voltages. Other safety issues such as high voltage, confined space and explosion hazards are also eliminated in underground vault locations, since the device can communicate information to locations outside the confined space or hazardous location. This also allows equipment users to interface with their equipment without breaching secure locations (such as underground vaults in urban areas which have been secured for homeland defense). If the remote power monitoring system of the present invention is embedded in a circuit breaker or network protector, the wireless interface allows the communication of information from the device without opening an electrical panel cover or access door, thus greatly increasing user safety.

In addition, the control functionality of the remote power monitoring system of the present invention allows the control of other equipment from outside the hazardous location. A wired port (preferably an RS-232 or I2C) or wireless communication link from the remote power monitoring system of the present invention connects to other equipment (such as a circuit breaker, network protector, recloser, etc.) Other types of communication technologies may also be utilized including, but not limited to, Bluetooth, WiFi, cellular, optical, satellite, RF, conventional telephone system, Ethernet, LAN, WAN, coax, RS-485, INCOM, SCADA or the like.

The remote power monitoring system of the present invention can initiate control signals based on its own measurements, or relay received commands from the wireless interface. This allows the user to use existing software to control its equipment, without modification, but without having to enter a confined space, voltage area, or other hazardous or inaccessible location. The compact size of the remote power monitoring system of the present invention allows for placement inside other pieces of equipment, such as a network protector, circuit breaker, electrical panel, switchgear, transformer, etc., where it was previously impractical to do so.

Voltage signals are routed through a voltage front-end in the remote power monitoring system of the present invention, which reduces the high input voltages to appropriate levels. The signals are fed through signal conditioning circuitry, which terminates into an A/D converter. Each voltage channel is isolated for safety. The preferred method is galvanical isolation, however, it is understood that other methods may be used. Current inputs use conventional techniques.

The remote power monitoring system of the present invention is preferably controlled by a processor (i.e. a DSP), which interfaces to the A/D converters, wireless module, RS-232 port, I22C port, static RAM, FLASH memory, real-time clock, and other digital circuitry. This processor handles all computations, control functions, data storage, and communications. Firmware resides on a FLASH integrated circuit, which is also used for data storage.

A rechargeable battery provides power for operation during a power outage, and a primary battery provides long-term memory backup power. However, because of the compact size and power demand of the remote power monitoring system of the present invention, power may be drawn directly from the sources being measured without distorting measurements.

The remote power monitoring system of the present invention allows the recording of power quality data in novel applications due to its small size and power consumption, wireless interface, and safety designs. In the preferred embodiment, the remote power monitoring system of the present invention is currently designed for IEC Category III or higher environments, which are desired for electrical applications).

The challenge of reducing the device size so that it could be used in previously impractical situations was addressed with novel circuit design, and firmware algorithms (which relaxed constraints on the hardware). Some of these include but are not limited to:

The use of a combination of protective impedance and double insulation safety techniques in a single device to meet IEC Cat III or greater requirements. This includes the arrangement and selection of voltage front-end resistors, the physical placement of each circuit board, and the combination of the digital isolators and isolation transformer that comprises the voltage front-end and signal conditioning section.

The use of a signal digital line to combine the functions of an A/D clock and chip select signal. This multiplexing was achieved by a combination of timing circuitry and firmware control.

A multi-input, isolated power supply which allows the device to be powered from an input voltage channel, an external DC supply, or rechargeable internal battery.

An input circuit which allows the device to detect the presence of a distribution transformer. This lets the device distinguish the difference between a power outage and removal of the device from service.

Circuitry to allow digital isolators with a 4000 volt rating to meet 15,000 volt IEC Cat III tests.

Pre-regulator circuitry ensures that the power supply output is self-limiting or regulating.

Relay circuitry that uses the optical, wired or wireless link to monitor and control other equipment both by initiating control signals through the link and relaying control signals received through the optical, wired or wireless interface, through a port to attached equipment.

In an alternative embodiment, the remote power monitoring system of the present invention will initiate a connection to a communication link to transmit information to a central service computer. The central service computer receives the data stream from the remote power monitoring system. The data stream includes, but is not limited to: for single and multiple phases (raw sampled waveforms, RMS voltage and current, real power, apparent power, harmonics, phase angle, reactive power, power factor, displaced power factor, total harmonic distortion, total power quantities, total real and reactive and apparent power, total power factors, phase angles, cycle histograms, cycle event changes, flicker, abnormal voltages and power outages), for a remote power monitoring system (parameters, log, current device status, set up parameters, calibration and sensor data and the like.), for environmental conditions (temperature, humidity, pressure, the smoke content, security status, and the like), and for analog and digital parameters from attached equipment (transformer temperature, oil level, recloser and circuit breaker operation, network protector status, etc.)

With the data in the data stream, a service representative will be able to analyze and perform online troubleshooting of the power system device. Currently, a service representative actually has to visit the location of the power system device to acquire all the data items that are available in the data stream. This saves time and money in the effort to monitor the power system device.

If the service representative determines that adjustment can be made remotely, then the remote power monitoring system of the present invention facilitates the service representative in adjusting any system parameter in the power system device. In the past, adjustments of any system parameter required a service representative to actually physically go to the location of the power system device to perform the adjustment. With the remote adjustment feature, time and money is saved.

The remote power monitoring system of the present invention also enables the collection of power system device performance data for reporting purposes. This feature enables the producer of the power system device to monitor the power system device to track the performance of the power system device.

The remote power monitoring system of the present invention also enables the capability to download software patches, upgrades and new versions of software from the service computer to any supportable remote power system device. The remote power monitoring system of the present invention also enables the capability to download software patches, upgrades and new versions of software from the service computer to any device connected to the remote power monitoring system (e.g. such as a network protector, etc.)

The remote power monitoring system of the present invention is applicable to all computer processing systems connected to a power system device. The system and method for remote monitoring of a power system device is typically implemented in a networked computing arrangement in which any number of power system devices communicate with at least one service computer device. Examples of communication methods applicable include but are not limited to: the Internet, a local area network (LAN), a wide area network (WAN), CDMA, GSM, TDMA or other wireless network, SCADA, via a telephone line using a modem, any other like networks, or any combination of connections.

Referring now to the drawings, in which like numerals illustrate like elements throughout the several views, FIG. 1 illustrates an example of the network environment 3 for service devices (11, 12 or 13) and the remote monitoring devices 20 utilizing the remote power monitoring system of the present invention.

The network environment 3 includes power system devices 7(a-f). Service computers 11-13 contain applications, and service computer 13 further contains a database 14. Service computers 11-13 can access the remote monitoring devices 20(a-f) via intermittent connections 18(a-i), respectively, over network 18. Service computers 11-13 include, but are not limited to: PCs, workstations, laptops, PDAs, palm devices, tablets and the like. The computer 13 may also be connected to the local area network (LAN) within an organization.

The structure and operation of the remote power monitoring system enables the service computers 11-13 to monitor power system devices 7 (a-f) more efficiently than previously known systems. Particularly, the remote power monitoring system of the present invention enables the power system devices 7 (a-f) to operate more efficiently by increasing uptime and mean time between failures (MTBF) through closer monitoring. It also allows power system devices to operate closer to design limits, for a longer amount of time through closer monitoring. In addition, when a number of the devices are used, overall system characteristics may be monitored and analyzed (power quality, system impedances, power flow and load profiles, etc), resulting in better overall understanding and use of the power delivery system. When the remote monitoring devices 20(a-f) connect to the service computers 11-13, the user may have access to power system devices' 7(a-f) power measurements. In an alternative embodiment, service computer 13 may provide online or remote support. The power measurements from power system devices 7(a-f) may be stored on the database 14 for later comparisons and statistical analysis.

As depicted in FIG. 1, power system devices 7 (a-f) are connected together via example transmission or distribution lines 5 (a-e). Attached to each of power system devices 7 is a remote monitoring device 20. The remote monitoring device 20 measures and records operational and environmental data for power systems 7. Then the remote monitoring device 20 provides for efficient communication of the measurements of power system 7 to service computers 11-13. Hereinafter, the service devices 11-13 will be referred to as to service device 11 for the sake of brevity.

As stated previously, there are a number of communication methods that can be utilized to perform the communication of the measurements. These methods include, but are not limited to, Bluetooth, WiFi, cellular (CDMA, TDMA, GSM, etc.), optical, satellite, RF, conventional telephone system, Ethernet (wired or wireless), LAN, WAN or the like. The service device may implement two or more communication methods, and may also act as a bridge or router between two or more methods, which would enable it to relay commands and data to other devices.

Figure 2A:
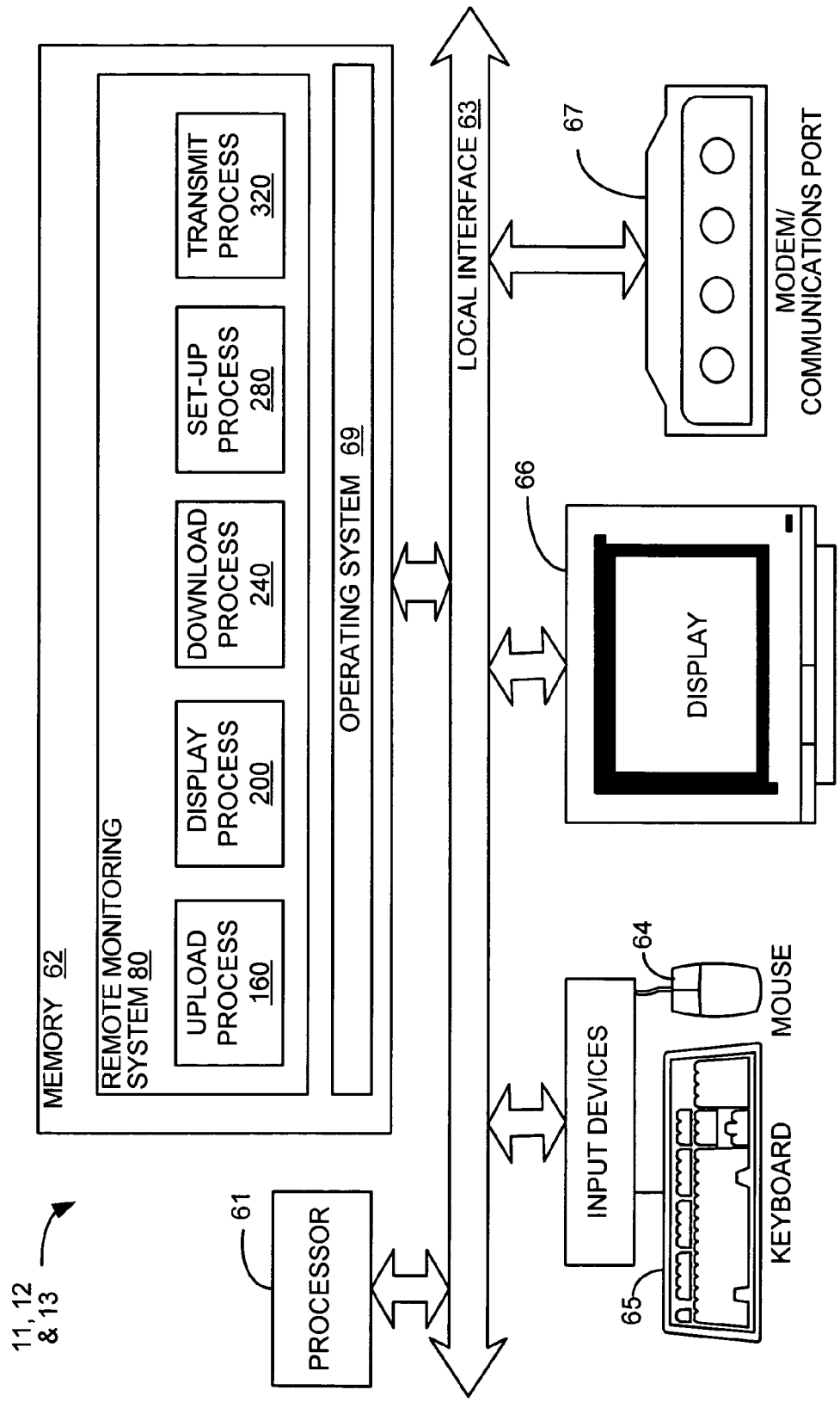
FIG. 2A is a block diagram illustrating an example of a service device utilizing the remote power monitoring system of the present invention, as shown in FIG. 1.
Figure 2B:
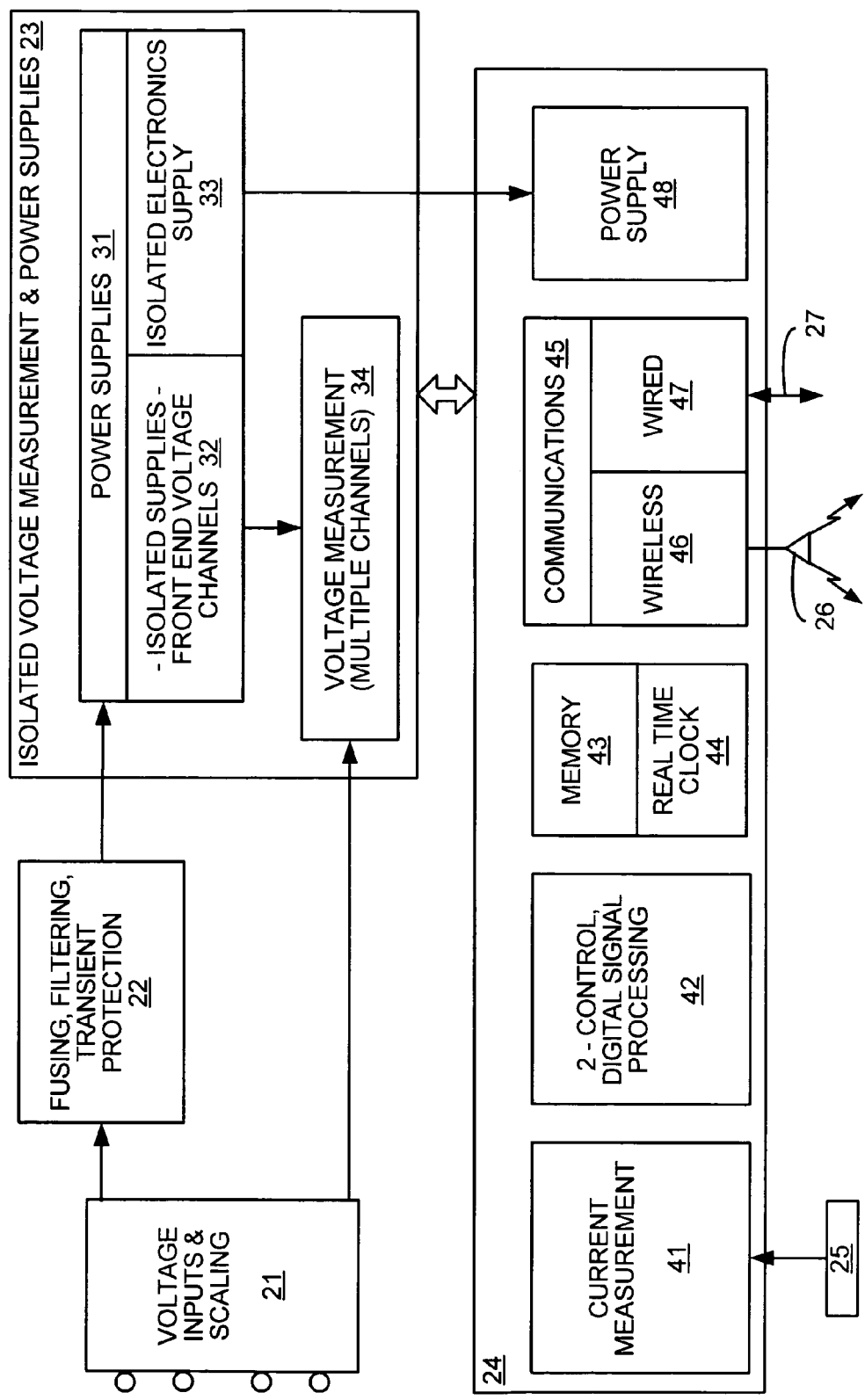
FIG. 2B is a block diagram illustrating an example of functional elements in the remote monitoring device to provide for the remote power monitoring system of the present invention, as shown in FIG. 1.
Figure 2C:
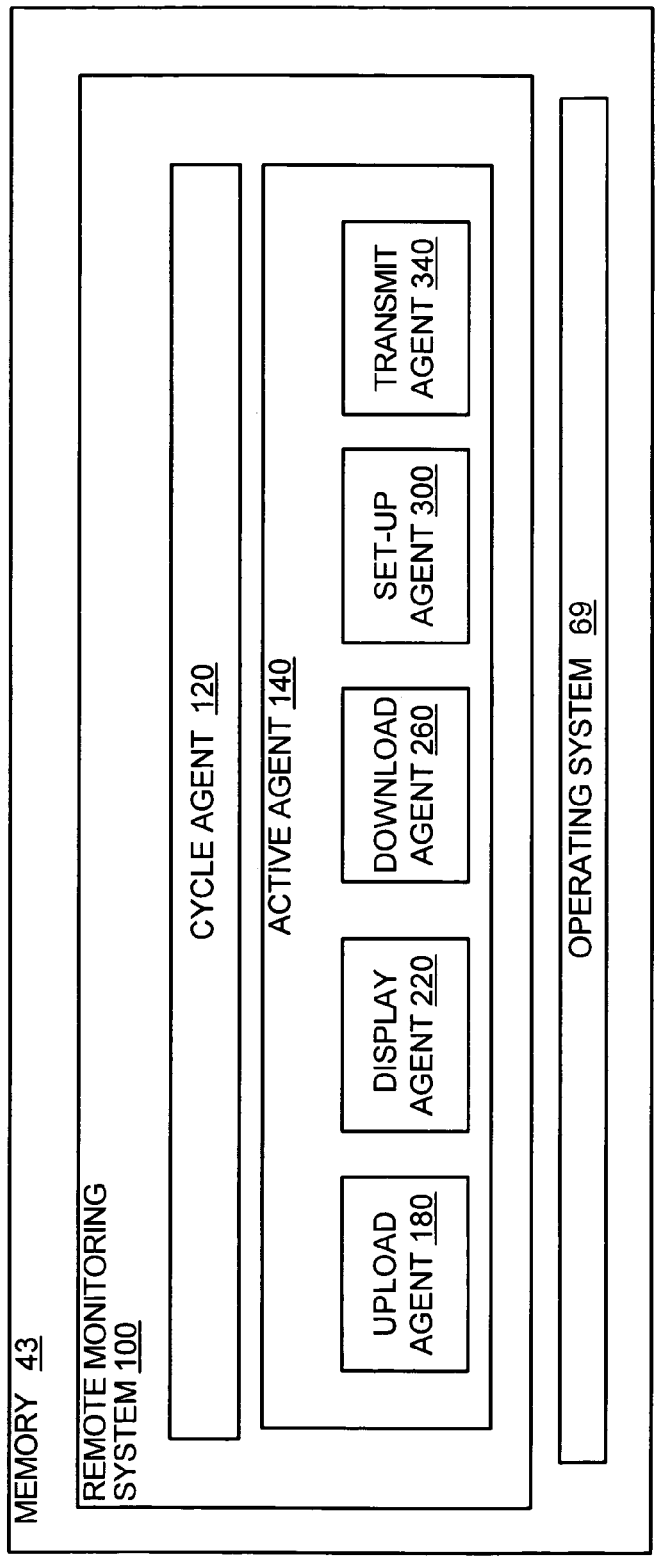
FIG. 2C is a block diagram illustrating an example of the memory for the remote monitoring device using the remote power monitoring system of the present invention, as shown in FIG. 2B.

Illustrated in FIG. 2A is a block diagram demonstrating an example of service device 11, as shown in FIG. 1, utilizing the remote monitoring system 80 of the present invention. Service device 11 includes, but is not limited to, PCs, workstations, laptops, PDAs, palm devices and the like. Illustrated in FIGS. 2B and 2C, is an example demonstrating a remote monitoring device 20 utilizing the remote monitoring system of the present invention. The processing components of the remote monitoring device 20 are similar to that of the description for the service computer 11-13 (FIG. 2A).

Generally, in terms of hardware architecture, as shown in FIG. 2A, the service computer 11 includes a processor 61, memory 62, and one or more input and/or output (I/O) devices (or peripherals) that are communicatively coupled via a local interface 63. The local interface 63 can be, for example but is not limited to, one or more buses or other wired or wireless connections, as is known in the art. The local interface 63 may have additional elements, which are omitted for simplicity, such as controllers, buffers (caches), drivers, repeaters, and receivers, to enable communications. Further, the local interface 63 may include address, control, and/or data connections to enable appropriate communications among the aforementioned components.

The processor 61 is a hardware device for executing software that can be stored in memory 62. The processor 61 can be virtually any custom made or commercially available processor, a central processing unit (CPU), data signal processor (DSP) or an auxiliary processor among several processors associated with the service computer 16, and a semiconductor based microprocessor (in the form of a microchip) or a macroprocessor. Examples of suitable commercially available microprocessors for the preferred embodiment include but are not limited to an ADSP-218x DSP from Analog Devices, a TMS320Cxx DSP from Texas Instruments, an ARM-based processor, or a Phillips 80C552 processor. It is understood that other types of commercially available low-power microprocessors may be utilized, and these other types include, but are not limited to, an 80×86 or Pentium series microprocessor from Intel Corporation, U.S.A., a PowerPC microprocessor from IBM, U.S.A., a Sparc microprocessor from Sun Microsystems, Inc, a PA-RISC series microprocessor from Hewlett-Packard Company, U.S.A., or a 68xxx series microprocessor from Motorola Corporation, U.S.A.

The memory 62 can include any one or combination of volatile memory elements (e.g., random access memory (RAM, such as dynamic random access memory (DRAM), static random access memory (SRAM), etc.)) and nonvolatile memory elements (e.g., ROM, erasable programmable read only memory (EPROM), FLASH memory, electronically erasable programmable read only memory (EEPROM), programmable read only memory (PROM), tape, compact disc read only memory (CD-ROM), disk, diskette, cartridge, cassette or the like, etc.). Moreover, the memory 62 may incorporate electronic, magnetic, optical, and/or other types of storage media. Note that the memory 62 can have a distributed architecture, where various components are situated remote from one another, but can be accessed by the processor 61.

The software in memory 62 may include one or more separate programs, each of which comprises an ordered listing of executable instructions for implementing logical functions. In the example illustrated in FIG. 2A, the software in the memory 62 includes a suitable operating system (O/S) 69 and the remote monitoring system 80 of the present invention.

As illustrated, the remote monitoring system 80 of the present invention comprises numerous functional components including but not limited to upload process 160, display process 200, download process 240, setup process 280 and transmit process 320.

A non-exhaustive list of examples of suitable commercially available operating systems 69 is as follows (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is open source software that is readily available on the Internet; (e) a run time Vxworks operating system from WindRiver Systems, Inc.; or (f) an appliance-based operating system, such as that implemented in handheld computers or personal data assistants (PDAs) (e.g., Symbian OS available from Symbian, Inc., PalmOS available from Palm Computing, Inc., and Windows CE available from Microsoft Corporation). O/S 69 may also be a customized operating system for the remote monitoring device 20.

The O/S 69 essentially controls the execution of other computer programs, such as the remote monitoring system 80, and provides scheduling, input-output control, file and data management, memory management, and communication control and related services. However, it is contemplated by the inventors that the remote monitoring system 80 of the present invention is applicable on all other commercially available operating systems.

The remote monitoring system 80 may include instructions, such as a source program, executable program (object code), script, or any other entity comprising a set of instructions to be performed. When a source program, then the program is usually translated via a compiler, assembler, interpreter, or the like, which may or may not be included within the memory 62, so as to operate properly in connection with the O/S 69. Furthermore, the instructions of the remote monitoring system 80 may also be written as (a) an object oriented programming language, which has classes of data and methods, or (b) a procedure programming language, which has routines, subroutines, and/or functions, for example but not limited to, C, C++, Pascal, BASIC, FORTRAN, COBOL, Perl, Java, ADA, assembly language and the like.

The I/O devices may include input devices, for example but not limited to, a keyboard 65, mouse 64, scanner (not shown), microphone (not shown), etc. Furthermore, the I/O devices may also include output devices, for example but not limited to, a printer (not shown), display 66, etc. Finally, the I/O devices may further include devices that communicate both inputs and outputs, for instance but not limited to, a NIC or modulator/demodulator 67 (for accessing power system devices, other files, devices, systems, or a network), a radio frequency (RF) or other transceiver (not shown), a telephonic interface (not shown), a bridge (not shown), a router (not shown), etc.

If the service computer 11 is a PC, workstation, intelligent device or the like, the software in the memory 62 may further include a basic input output system (BIOS) (omitted for simplicity). The BIOS is a set of essential software routines that initialize and test hardware at startup, start the O/S 69, and support the transfer of data among the hardware devices. The BIOS is stored in some type of read-only-memory, such as ROM, PROM, EPROM EEPROM or the like, so that the BIOS can be executed when the service computer 11 is activated.

When the computers 11-13 are in operation, the processor 61 is configured to execute software stored within the memory 62, to communicate data to and from the memory 62, and to generally control operations of the service computers 11-13 pursuant to the software. The remote monitoring system 80 and the O/S 69 are read, in whole or in part, by the processor 61, perhaps buffered within the processor 61, and then executed.

When the remote monitoring system 80 is implemented in software, as is shown in FIG. 2A, it should be noted that the remote monitoring system 80 can be stored on virtually any computer readable medium for use by or in connection with any computer related system or method. In the context of this document, a computer readable medium is an electronic, magnetic, optical, or other physical device or means that can contain or store a computer program for use by or in connection with a computer related system or method. The remote monitoring system 80 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but is not limited to, an electronic, magnetic, optical, electromagnetic, infrared, or semiconductor system, apparatus, device, or propagation medium.

More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium, upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the remote monitoring system 80 can be implemented with one or any combination of circuit technologies which are known in the art, including but not limited: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Illustrated in FIG. 2B is a block diagram demonstrating an example of functional elements in the remote monitoring device 20 that enables the remote power monitoring system of the present invention, as shown in FIG. 1. The remote monitoring device 20 measures numerous power characteristics of power system device 7 and computes a number of recordable measurements. The characteristics and recordable measurements are then stored in memory for later access by service device 11-13.

The functional elements of the remote monitoring device 20 include the voltage input and scaling circuitry 21, and filtering and transient protection circuitry 22. Voltage input and scaling circuitry 21 samples voltages from a conductor (not shown) as input to filtering and transient protection circuitry 22 and voltage measurement circuitry 34.

In the preferred embodiment, the voltage input and scaling circuitry 21 includes an isolator circuit to eliminate the need for a third optical insulator per channel and pre-regulator circuitry. The isolator circuit and pre-regulator circuitry are illustrated in further detail with regard to FIGS. 10 and 11 respectively.

The remote monitoring device 20 further includes the isolated voltage measurement and power supply circuitry 23. The isolated voltage measurement and power supply circuitry 23 further includes power supply circuitry 31, front end voltage channels circuitry 32, isolated electronic supply circuitry 33 and voltage measurement circuitry 34. As shown, there are multiple voltage inputs to voltage input and scaling circuitry 21 and therefore, multiple inputs into voltage measurement circuitry 34. The voltage measurement circuitry 34 further includes isolator circuitry that is herein illustrated in further detail with regard to FIG. 10.

The power supply circuitry 31 includes circuitry to a multi-input and isolated power supply. The power supply circuitry 31 with multi-inputs enables the remote monitoring device 20 to be powered from an input voltage channel, external PC's power supply or other DC source (such as a wall adapter or external battery), or a rechargeable internal battery. An example of the multi-source power supply component is herein illustrated in further detail with regard to FIG. 12.

Digital components of the remote monitoring device 20 include power supply circuitry 48, current measurement circuitry 41, digital signal processor (DSP) 42, memory 43, real-time clock circuitry 44 and communication circuitry 45 that is connected to both wireless circuitry 46 and wired circuitry 47. Power supply circuitry 48 is herein illustrated in greater detail with regard to FIG. 12.

The DSP 42 samples the digital voltage and current waveform data and controls storage of the waveform data in the memory 43. From voltage and current waveform data sampled by DSP 42 and stored in memory 43, all standard power quality parameters can be calculated. That is, for example, RMS voltage, current, power, power factor, and harmonics, all can be computed. The DSP 42 is herein illustrated in greater detail with regard to FIG. 15.

Figure 13:
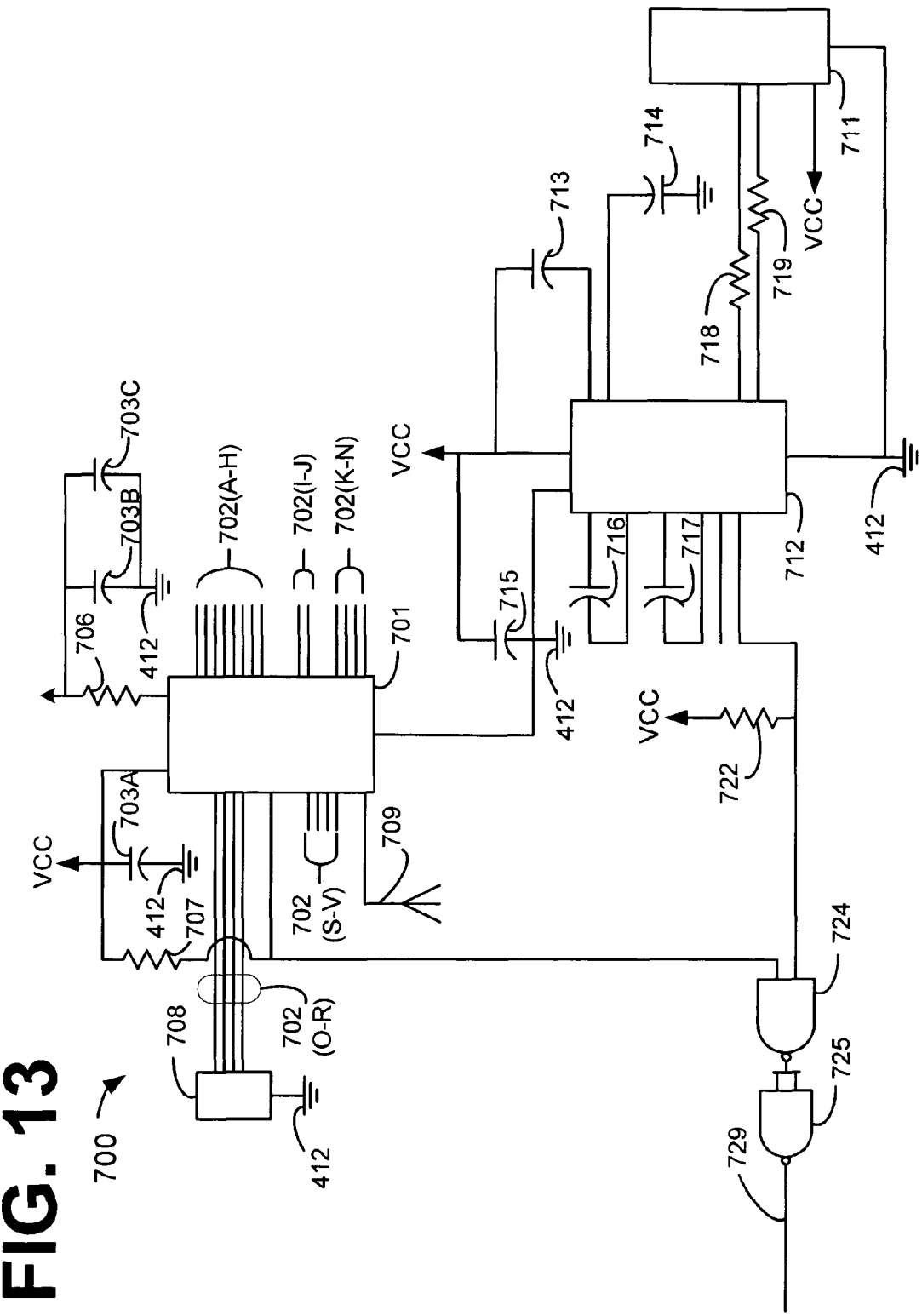
FIG. 13 is a schematic diagram illustrating an example of a transmitter component in the remote power monitoring system of the present invention, as shown in FIG. 2B.

Communication circuitry 45, wireless circuitry 46 and wired circuitry 47 are illustrated in greater detail with regard to FIG. 13. Wireless circuitry 46 provides for wireless transmission and therefore preferably has only small power consumption requirements itself. To this end, DSP 42 controls modulation of a RF signal generated by wireless circuitry 46 to transmit any desired digital waveform data from memory 43.

A personal data assistant (PDA) 11, laptop 12 or similar device communicates with wireless circuitry 46 to receive the waveform data transmittal by remote monitoring device 20. PDA 11 and laptop 12 are contemplated as having RF reception and demodulation capabilities in order to provide real-time waveforms and power quality data from the transmitted waveform data in user-readable form. The PDA 11 and laptop 12 generally have sufficient computational capacity to perform all necessary calculations to present the standard power quality parameters, and to display the voltage and current waveforms present in the monitored conduct, and then display this data by way of its display (not shown).

The PDA 11 and laptop 12 can be any kind of device with wireless capability, as will be apparent to those of ordinary skill. Preferred PDA 11 and laptop 12 downloads recorded power quality parameter data and waveform data from the remote monitoring device 20 for later analysis. It is to be noted that a technician holding and operating PDA 11 and laptop 12 will remain isolated away from voltages on the monitored cable (not shown). As such, only initial connection of remote monitoring device 20 need be done in proximity to voltage and current conditions. Thereafter, analysis and review of voltage and current waveform data detected and recorded by the remote monitoring device 20 can be done remotely ands safely from the monitored voltage and current cables at the PDA 11 or laptop 12

FIG. 2C is a block diagram illustrating an example of the memory 43 for the remote monitoring device 20 using the remote monitoring system 100 of the present invention, as shown in FIG. 2B. Located in memory 43 is the remote monitoring system 100 which includes, but is not limited to, cycle data agent 120 and activity agent 140. The activity agent 140 further includes upload agent 180, display agent 220, download agent 260, set-up agent 280 and transmit agent 340. The agents are herein defined in further detail with regard to FIGS. 3A, 3B, 4B, 5B, 6B, 7B, 8B and 9B respectively. When the remote monitoring system 100 is implemented in software, as is shown in FIG. 2C, it can be stored on virtually any computer readable medium for use by or in connection with any computer related system or method.

In an alternative embodiment, where the remote monitoring device 20 is implemented in hardware, the remote monitoring system 100 can be implemented with one or any combination of circuit technologies which are known in the art, including but not limited: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In the example illustrated, the cycle data agent 120 computes characteristics of the converted digital data. The activity agent 140 controls all non-power monitoring management. The upload agent 180 enables the remote monitoring device 20 to upload data to be in service device 11. The display agent 220 enables the service device 11 to acquire real-time data for display. The download agent 260 enables the remote monitoring device 20 to download additional software or software changes. The setup agent 300 enables modification of the system parameters for remote monitoring device 20 by a service representative. The transmit agent 340 provides for the transmission of data capture from power system device 7 and computed by remote monitoring device 20 to service device 11-13.

Figure 3A:
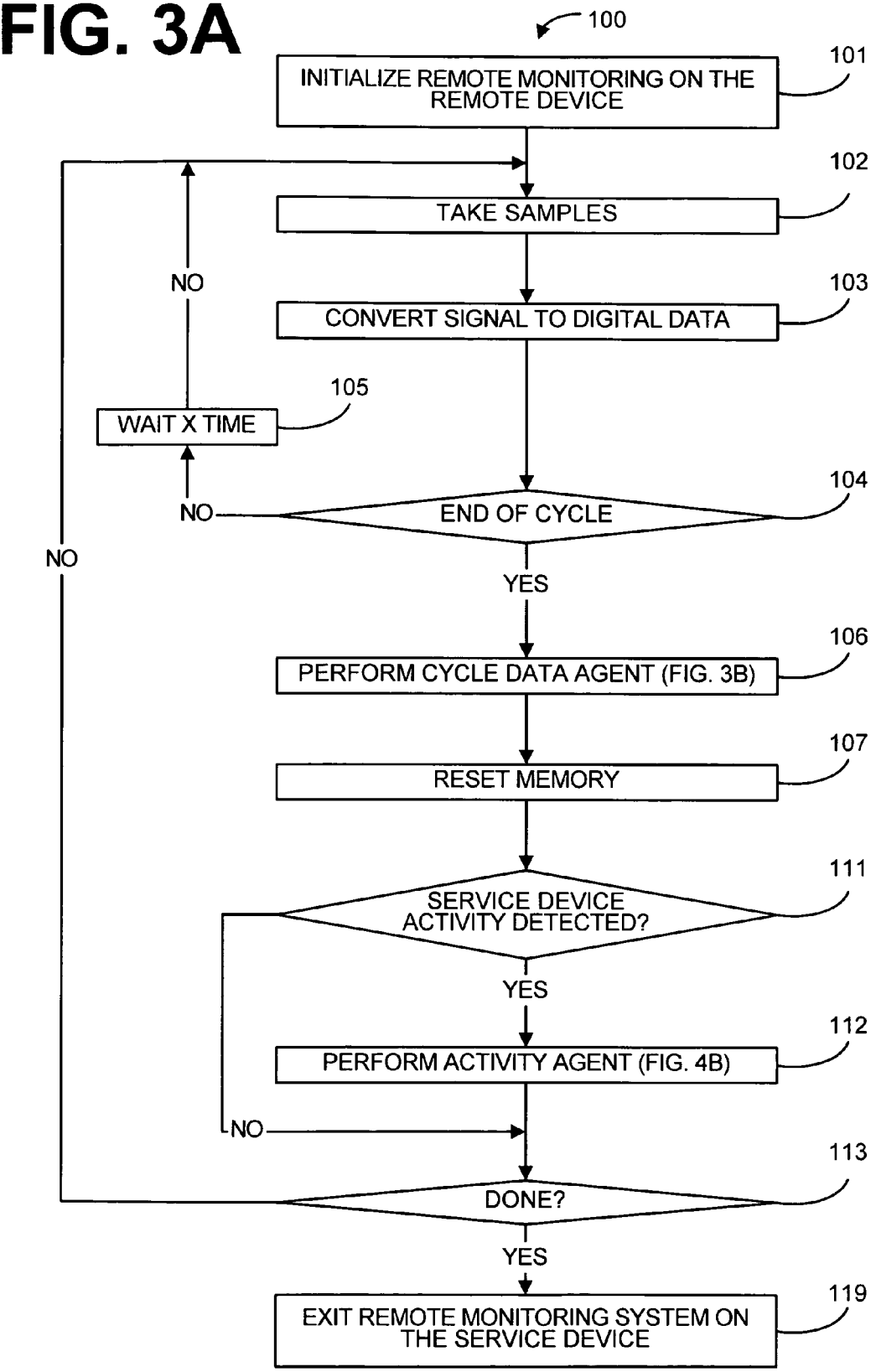
FIG. 3A is a flow chart illustrating an example of the operation of the remote power monitoring system of the present invention on the remote monitoring device, as shown in FIGS. 1, 2B and 2C.

FIG. 3A is a flow chart illustrating an example of the operation of the remote monitoring system 100 of the present invention on the remote monitoring device 20, as shown in FIGS. 1, 2B and 2C. The remote monitoring system 100 controls the remote monitoring device 20. The remote monitoring system 100 enables a service technician to acquire data measurements and computational values for a power system device 7.

First at step 101, the remote monitoring system 100 is initialized. This initialization includes the startup routines and processes embedded in the BIOS of the remote monitoring device 20. The initialization also includes the establishment of data values for particular data structures utilized in the remote monitoring device 20 and remote monitoring system 100.

At step 102, the remote monitoring system 100 takes the sample data measurements from the power system device 7. At step 103, these data measurements are converted to digital data. At step 104, it is determined if the signal being measured is at the end of the cycle. If it is determined at step 104 that the signal being measured is not at the end of the cycle, then the remote monitoring system 100 waits a predetermined amount of time at step 105. After waiting a predetermined amount of time at step 105, the remote monitoring system 100 returns to repeat steps 102 through 104. However, if it is determined at step 104 that the signal being measured is at the end of the cycle, then the cycle data agent is performed at step 106. The cycle data agent is herein defined in further detail with regard to FIG. 3.

At step 107, memory area for storing of the digital data signals acquired at step 103 is reset. This allows the next cycle of data to be captured. At step 111, it is determined if service device activity detected. If it is determined at step 111 that a service device activity is not detected, then the remote monitoring system 100 proceeds to step 113 to determined if there are more data samples to be captured. However, if it is determined at step 111 that service device activity is detected, then the remote monitoring system 100 performs the activity agent at step 112. The activity agent is herein defined in further detail with regard to FIG. 4B.

At step 113 the remote monitoring system 100 determines if more data samples are to be captured. If it is determined at step 113 that there are more data samples to be captured, then the remote monitoring system 100 returns to repeat steps 102 through 113. However, if it is determined at step 113 that there are no more data samples to be captured, then the remote monitoring system 100 exits at step 119.

Figure 3B:
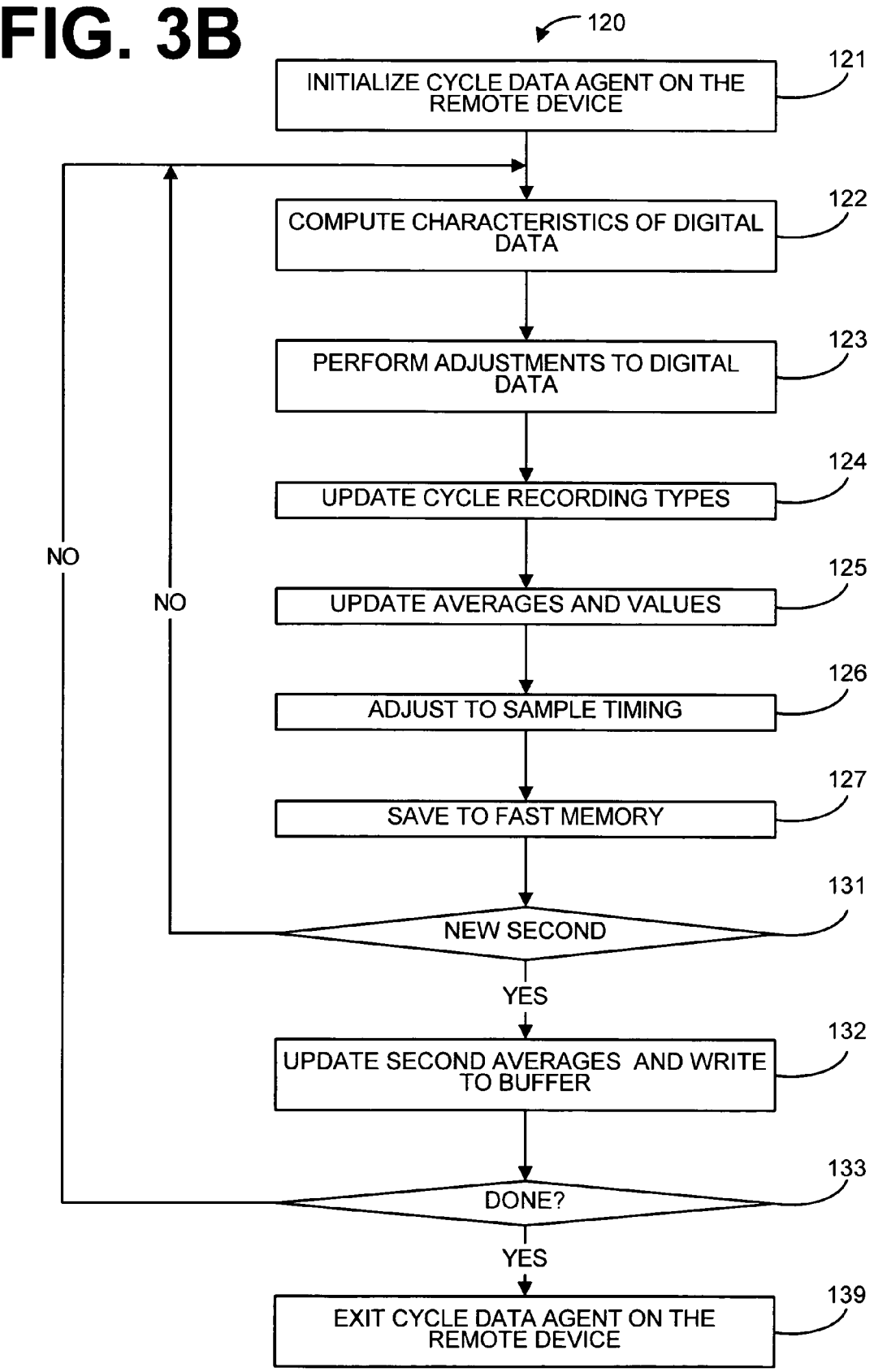
FIG. 3B is a flow chart illustrating an example of the operation of the cycle data agent on the remote monitoring device used in conjunction with the remote power monitoring system of the present invention, as shown in FIGS. 1, 2B, 2C and 3A.

FIG. 3B is a flow chart illustrating an example of the operation of the cycle data agent 120 on the remote monitoring device 20 used in conjunction with the remote monitoring system 100 of the present invention, as shown in FIGS. 1, 2B, 2C and 3A. The cycle data agent 120 acquires the data measurements from power system device 7 and computes characteristics of that measured data.

First at step 121, the cycle data agent 120 is initialized. This initialization includes the startup routines and processes embedded in the BIOS of the remote monitoring device 20. The initialization also includes the establishment of data values for particular data structures utilized in the cycle data agent 120. At step 122, characteristics of the digital data are then computed. These characteristics include, but are not limited to, for single and multiple phases (RMS voltage and current, real power, apparent power, harmonics, phase angle, reactive power, power factor, displaced power factor, total harmonic distortion, total power quantities, total real and reactive and apparent power, total power factors, phase angles, cycle histograms, cycle event changes, flicker, abnormal voltages and power outages).

At step 123, any adjustments necessary to the digital data is performed. Adjustments include gain and offset corrections, as well as frequency-dependent harmonic correction factors. At step 124, the cycle recording types are updated, including RMS voltage and current, real, reactive and apparent power, power factor, displacement power factor, phase angle, harmonic magnitudes and phases, and total harmonic distortion.

At step 125, the averages and values for the signal being measured are updated. At step 126, in any adjustments necessary to the sample timing are made. At step 127, all the computed of cycle data is saved to fast memory. At step 131, it is determined if the cycle is on a new second. If it is determined at step 131 that a cycle for a new second has not occurred, then the cycle data agent 120 returns to repeat steps 122 through 131.

However, if it is determined that a new second is started, then the cycle data agent 120 then updates the second averages and write these values to a buffer at step 132. At step 133, the cycle data agent 120 determines if there are more cycles to be processed. If it is determined at step 133 that there are more cycles to be processed, then the cycle data agent 120 returns to repeat steps 122 through 133. However, if it is determined that there are no more cycles to be processed, the cycle data agent 120 then exits at step 139.

Figure 4A:
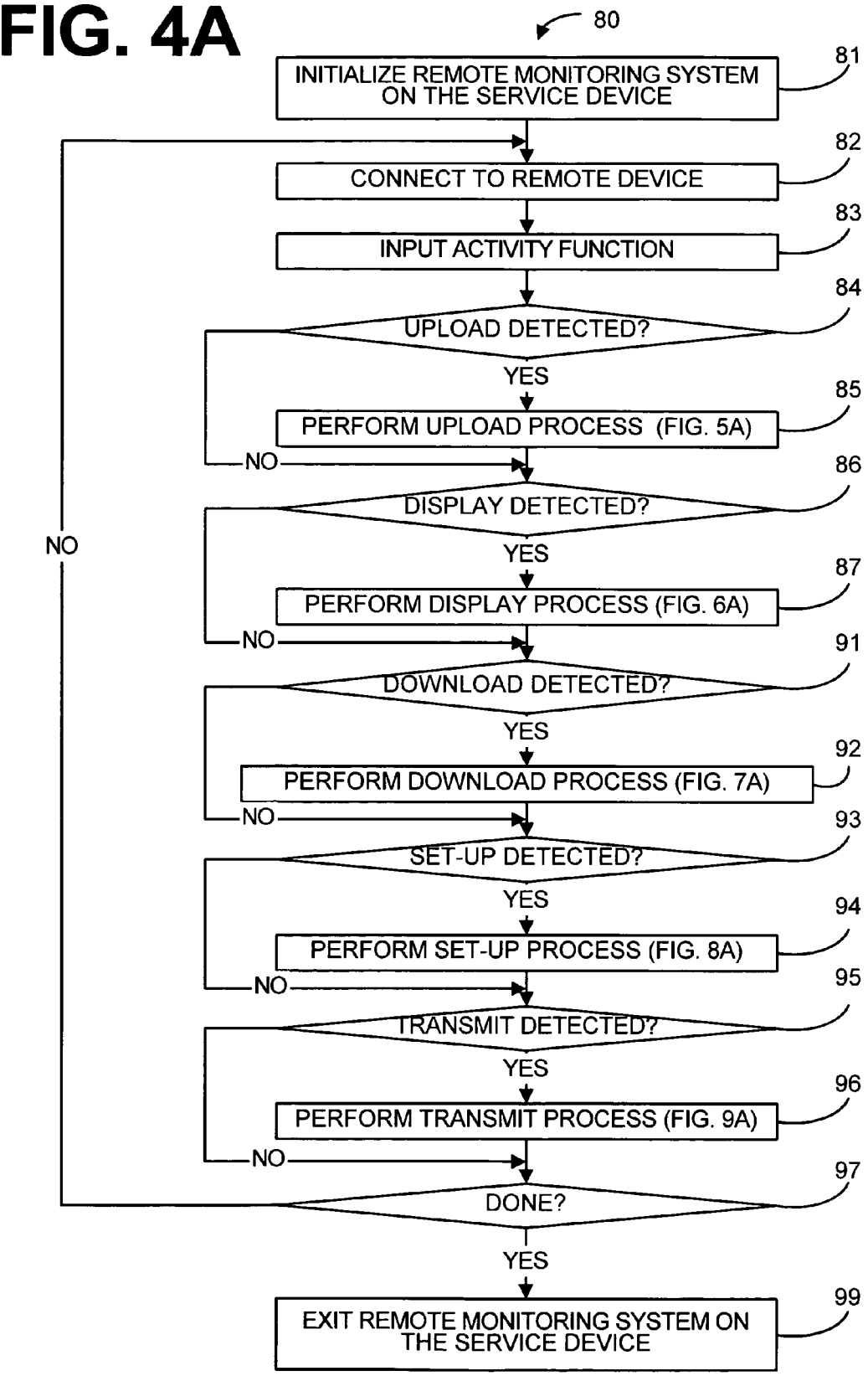
FIG. 4A is a flow chart illustrating an example of the operation of the remote power monitoring system of the present invention on the service device, as shown in FIGS. 1 and 2A.

FIG. 4A is a flow chart illustrating an example of the operation of the remote monitoring system 80 of the present invention on the service device 11, as shown in FIGS. 1 and 2A. The remote monitoring system 80 running on service device 11 enables a user access to measured and computed data power from system device 7.

First at step 81, the remote monitoring system 80 is initialized. This initialization includes the startup routines and process embedded in the BIOS of the service device 11. The initialization also includes the establishment of data values for particular data structures utilized in the remote monitoring system 80. At step 82, the service device 11 connects to the remote monitoring device 20. The activity function is then enabled for input by a user at step 83.

At step 84, it is determined if an upload activity is detected. If it determined at step 84 that an upload activity is not detected, then the remote monitoring system 80 proceeds to step 86. However, if it is determined at step 84 that an upload activity is detected, then the remote monitoring system 80 on the service device 11 performs the upload process at step 85. The upload processes herein is defined in further detail with regard to FIG. 5A.

At step 86, it is determined if a display activity is detected. If it determined at step 86 that a display activity is not detected, then the remote monitoring system 80 proceeds to step 91. However, if it is determined at step 86 that a display activity is detected, then the remote monitoring system 80 performs the display process at step 87. The display processes herein is defined in further detail with regard to FIG. 6A.

At step 91, it is determined if a download activity is detected. If it determined at step 91 that a download activity is not detected, then the remote monitoring system 80 proceeds to step 93. However, if it is determined at step 91 that a download activity is detected, then the remote monitoring system 80 performs the download process at step 92. The download processes herein are defined in further detail with regard to FIG. 7A.

At step 93, it is determined if a setup activity is detected. If it is determined at step 93 that a setup activity is not detected, then the remote monitoring system 80 proceeds to step 95. However, if it is determined at step 93 that a setup activity is detected, then the remote monitoring system 80 performs the setup process at step 94. The setup processes herein is defined in further detail with regard to FIG. 8A.

At step 95, it is determined if a transmit activity is detected. If it determined at step 95 that a transmit activity is not detected, then the remote monitoring system 80 proceeds to step 97. However, if it is determined at step 95 that a transmit activity is detected, then the remote monitoring system 80 performs the transmit process at step 96. The transmit processes are herein defined in further detail with regard to FIG. 9A.

At step 97, it is determined if there are more activities to be processed. If it is determined that there are more activities to be processed, the remote monitoring system 80 returns to repeat steps 82 through 97. However, if it is determined at step 97 that there are no more activities to be processed, then the remote monitoring system 80 exits at step 99.

FIG. 4B is a flow chart illustrating an example of the operation of the activity agent 140 on the remote monitoring device 20 used in conjunction with the remote monitoring system 100 of the present invention, as shown in FIGS. 2B, 2C, 3A, 3B, and 4A. The activity agent 140 processes all interaction with the service device 11.

First at step 141, the activity agent 140 is initialized. This initialization includes the startup routines and processes embedded in the BIOS of the remote monitoring device 20. The initialization also includes the establishment of data values for particular data structures utilized in the activity agent 140. At step 142, the activity agent 140 waits for requests to connect to service device 11. After receiving a request to connect to service device 11, the activity agent 140 then accepts the activity function input from the user on service device 11.

At step 144, the activity agent 140 determines if an upload request is detected. If it determined at step 144 that an upload request is not detected, then the activity agent 140 proceeds to step 146. However, if it is determined at step 144 that an upload request is detected, then the activity agent 140 on the service device 11 performs the upload agent at step 85. The upload agent is herein defined in further detail with regard to FIG. 5B.

At step 146, it is determined if a display request is detected. If it determined at step 146 that a display request is not detected, then the activity agent 140 proceeds to step 151. However, if it is determined at step 146 that a display request is detected, then the activity agent 140 performs the display agent at step 147. The display agent is herein defined in further detail with regard to FIG. 6B.

At step 151, it is determined if a download request is detected. If it determined at step 151 that a download request is not detected, then the activity agent 140 proceeds to step 153. However, if it is determined at step 151 that a download request is detected, then the activity agent 140 performs the download agent at step 152. The download agent is herein defined in further detail with regard to FIG. 7B.

At step 153, it is determined if a setup request is detected. If it determined at step 153 that a setup request is not detected, then the activity agent 140 proceeds to step 155. However, if it is determined at step 153 that a setup request is detected, then the activity agent 140 performs the setup agent at step 154. The setup agent is herein defined in further detail with regard to FIG. 8A.

At step 155, it is determined if a transmit request is detected. If it determined at step 155 that a transmit request is not detected, then the activity agent 140 proceeds to step 157. However, if it is determined at step 155 that a transmit request is detected, then the activity agent 140 performs the transmit agent at step 156. The transmit agent is herein defined in further detail with regard to FIG. 15A.

At step 157, it is determined if there are more activities to be processed. If it is determined that there are more activities to be processed, the activity agent 140 returns to repeat steps 82 through 157. However, if it is determined at step 157 that there are no more activities to be processed, then the activity agent 140 exits at step 159.

FIG. 5A is a flow chart illustrating an example of the operation of the upload process 160 utilized by the remote monitoring system 80 of the present invention, as shown in FIGS. 2A, 3A and 4A. The upload process 160 enables the remote monitoring device 20 to upload data to the service device 11-13.

First at step 161, the upload process 160 is initialized. This initialization includes the startup routines and process embedded in the BIOS of the service device 11. The initialization also includes the establishment of data values for particular data structures utilized in the upload process 160.

At step 162, the upload process 160 attempts to connect to the remote monitoring device 20. At step 163, it is determined if the upload process 160 has successfully connected to the remote monitoring device 20. If it is determined at step 163 that a connection to the remote monitoring device 20 has not been successfully completed, then the service device 11 returns to repeat steps 162 and 163 provided that the maximum number of attempts has not been exceeded. However, if the maximum number of attempts has been exceeded, then the upload process 160 exits at step 169.

However, if it is determined at step 163 that a connection to the remote monitoring device 20 has been completed, then the upload process 160 enables a service representative to indicate the data items to be uploaded from the remote device at step 164. At step 165, the data items indicated are uploaded from the remote monitoring device 20. At step 166, it is determined if there are more data items to be uploaded. If it is determined that there are more data items to be uploaded, then the upload process 160 returns to repeat steps 164 through 166. However, if it is determined at step 166 it there are no more data items to be uploaded, the upload process 160 then proceeds to step 167.

At step 167, it is determined if there is a remote device connected to the currently connected remote monitoring device 20, and if the user wants to upload data through the currently connected remote monitoring device 20 to another remote monitoring device 20. If it is determined at step 167 that there is another remote monitoring device 20 connected to the currently connected remote monitoring device 20, and that the user wants to upload data through the currently connected remote monitoring device 20, the other remote monitoring device 20 is then identified at step 168. The upload process 160 returns to repeat steps 161 through 168 for the other remote monitoring device 20. These actions will cause the currently connected remote monitoring device 20 to be utilized as a conduit to another remote monitoring device 20.

However, if it is determined at step 167 that either another remote monitoring device 20 is not a available through the currently connected remote monitoring device 20 or that the user does not wish to access another remote monitoring device 20, then the upload process 160 exits at step 169.

Figure 5B:
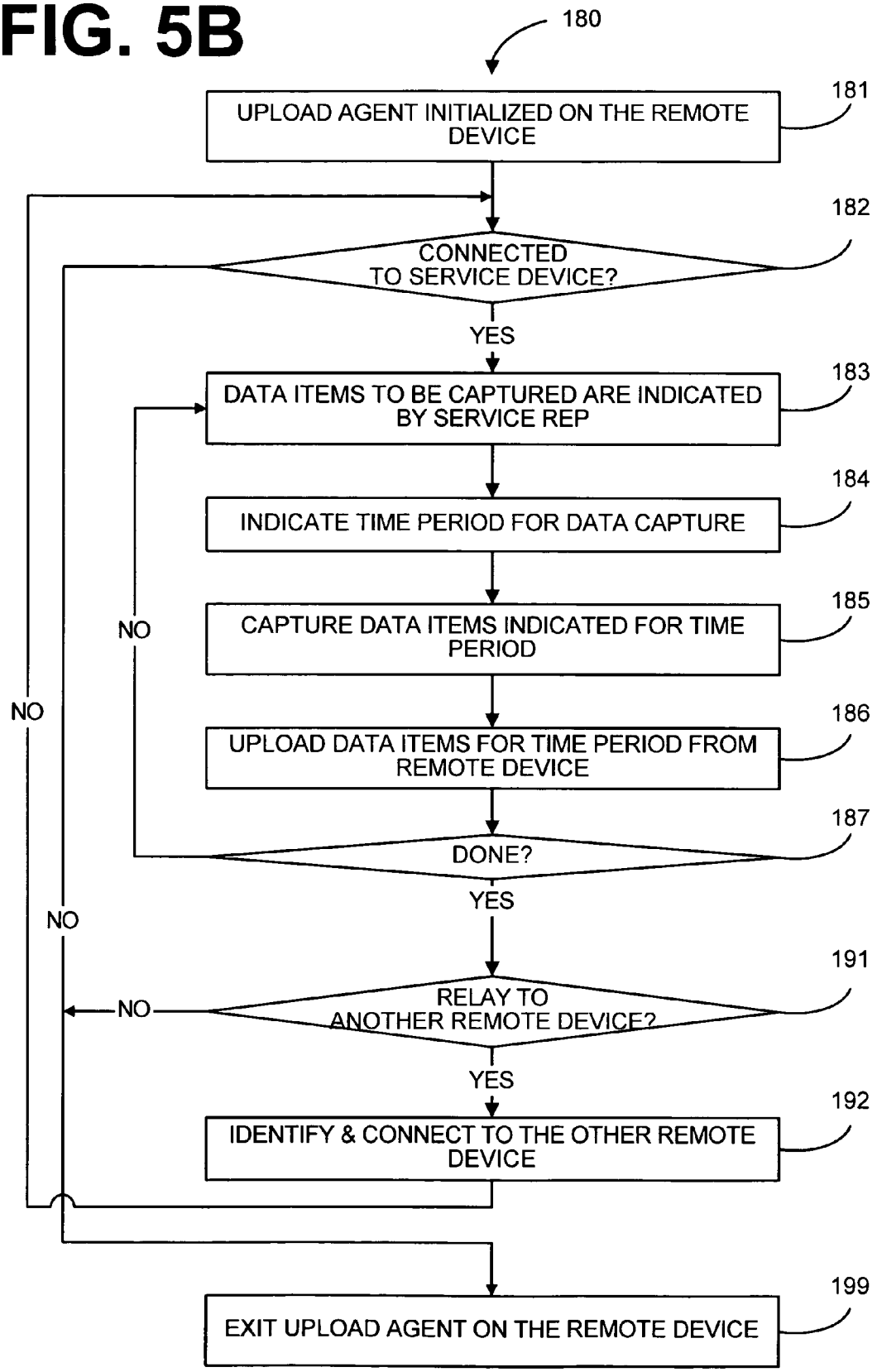
FIG. 5B is a flow chart illustrating an example of the operation of the upload agent utilized in the remote monitoring device and utilized by the remote power monitoring system of the present invention, as shown in FIGS. 2B, 3B, 3C and 4B.

FIG. 5B is a flow chart illustrating an example of the operation of the upload agent 180 utilized in the remote monitoring device 20 and utilized by the remote monitoring system 100 of the present invention, as shown in FIGS. 2B, 3B, 3C and 4B. The upload agent 180 enables the remote monitoring device 20 to upload data to be in service device 11-13.

First at step 181, the upload agent 180 is initialized. This initialization includes the startup routines and processes embedded in the BIOS of the remote monitoring device 20. The initialization also includes the establishment of data values for particular data structures utilized in the upload agent 180. At step 182, the upload agent 180 determines if the remote monitoring device 20 is connected to a service device 11. If it is determined at step 182 that the remote monitoring device 20 is not connected to service device 11, then the upload agent 180 exits at step 199.

However, if it is determined at step 182 that the remote monitoring device 20 is connected to the service device 11, then the upload agent 180 allows the service representative to indicate the data items to be captured. At step 184, the time period for data capture is indicated by the service representative. At step 185, the upload agent 180 then captures the data items indicated for the indicated time period. The data items captured for the indicated time period are then uploaded from the remote monitoring device 20 to the service device 11 at step 186.

At step 187, the upload agent 180 determines if there are more data items to be captured. If it is determined at step 187 that there are more data items to be captured, the upload agent 180 then returns to repeat steps 183 through 187. However, if it is determined at step 187 that there are no additional data items to be captured, then the upload agent 180 proceeds to step 191.

At step 191, it is determined if there is a remote monitoring device 20 connected to the currently connected remote monitoring device 20. The upload agent 180 indicates the remote monitoring devices 20 that are connected to the currently connected remote monitoring device 20. The upload agent 180 then determines if the user wants to upload data through the currently connected remote monitoring device 20 to another remote monitoring device 20 by the user input identifying the other remote device to be connected.

If it is determined at step 191 that the user wants to upload data through the currently connected remote monitoring device 20, the other remote monitoring device 20 is then identified at step 192. The upload process 160 returns to repeat steps 182 through 191 for the other remote monitoring device 20. These actions will cause the currently connected remote monitoring device 20 to be utilized as a conduit to another remote monitoring device 20.

However, if it is determined at step 191 that either another remote monitoring device 20 is not a available through the currently connected to remote monitoring device 20 or that the user does not wish to access another remote monitoring device 20, then the upload process 160 exits at step 199.

FIG. 6A is a flow chart illustrating an example of the operation of the display process 200 on service device 11 and utilized by the remote monitoring system 80 of the present invention, as shown in FIGS. 2A, 3A and 4A. The display process 200 enables the service device 11 to acquire a real-time data from the remote monitoring device 20 for display.

First at step 201, the display process 200 is initialized. This initialization includes the startup routines and process embedded in the BIOS of the service device 11. The initialization also includes the establishment of data values for particular data structures utilized in the display process 200.

At step 202, the display process 200 attempts to connect to the remote monitoring device 20. At step 203, it is determined if the display process 200 has successfully connected to the remote monitoring device 20. If it is determined at step 203 that a connection to the remote monitoring device 20 has not been successfully completed, then the service device 11 returns to repeat steps 202 and 203, provided that the maximum number of attempts has not been exceeded. However, if the maximum number of attempts has been exceeded, then the display process 200 exits at step 209.

However, if it is determined at step 203 that a connection to the remote monitoring device 20 has been completed, then the display process 200 enables a service representative to indicate the data items to be captured on the remote device for display at step 204. At step 205, the data items indicated are displayed from the remote monitoring device 20. At step 206, it is determined if there are more data items to be displayed. If it is determined that there are more data items to be displayed, then the display process 200 returns to repeat steps 204 through 206. However, if it is determined at step 206 that there are no more data items to be displayed, the display process 200 then proceeds to step 207.

At step 207, it is determined if there is any remote monitoring devices 20 connected to the currently connected remote monitoring device 20, and if the user wants to display data through the currently connected remote monitoring device 20 from another remote monitoring device 20. If it is determined at step 207 that there is another remote monitoring device 20 connected to the currently connected remote monitoring device 20, and that the user wants to display data through the currently connected remote monitoring device 20, then the other remote monitoring device 20 is identified at step 208. The display process 200 returns to repeat steps 200 through 207 for the other remote monitoring device 20. These actions will cause the currently connected remote monitoring device 20 to be utilized as a conduit to another remote monitoring device 20.

However, if it is determined that step 207 that either another remote monitoring device 20 is not a available through the currently connected remote monitoring device 20 or that the user does not wish to access and another remote monitoring device 20, then the display process 200 exits at step 209.

FIG. 6B is a flow chart illustrating an example of the operation of display agent 220 utilized in the remote monitoring device 20 and utilized by the remote monitoring system 100 of the present invention, as shown in FIGS. 2B, 3B, 3C and 4B. The display agent 220 enables the service device 11 to acquire a real-time data for display.

First at step 221, the display agent 220 is initialized. This initialization includes the startup routines and processes embedded in the BIOS of the remote monitoring device 20. The initialization also includes the establishment of data values for particular data structures utilized in the display agent 220. At step 222, the display agent 220 determines if the remote monitoring device 20 is connected to a service device 11. If it is determined at step 222 that the remote monitoring device 20 is not connected to service device 11, then the display agent 220 exits at step 239.

However, if it is determined at step 222 that the remote monitoring device 20 is connected to the service device 11, then the display agent 220 allows the service representative to indicate the data items to be captured. At step 224, the time period for data capture is indicated by the service representative. At step 225, the display agent 220 then captures the data items indicated for the indicated time period. The data items captured for the indicated time period are then uploaded from the remote monitoring device 20 to the service device 11 at step 226.

At step 227, the display agent 220 determines if there are more data items to be captured. If it is determined at step 227 that there are more data items to be captured, the display agent 220 then returns to repeat steps 223 through 227. However, if it is determined at step 227 that there are no additional data items to be captured, then the display agent 220 proceeds to step 231.

At step 231, it is determined if there is a remote monitoring device 20 connected to the currently connected remote monitoring device 20. The display agent 220 indicates the remote monitoring devices 20 that are connected to the currently connected remote monitoring device 20. The display agent 220 then determines if the user wants to display data through the currently connected remote monitoring device 20 to another remote monitoring device 20 by the user input identifying the other remote device to be connected. If it is determined at step 231 that the user wants to display data through the currently connected remote monitoring device 20, the other remote monitoring device 20 is then identified at step 232. The display process 160 returns to repeat steps 222 through 231 for the other remote monitoring device 20. These actions will cause the currently connected remote monitoring device 20 to be utilized as a conduit to another remote monitoring device 20.

However, if it is determined at step 231 that either another remote monitoring device 20 is not a available through the currently connected to remote monitoring device 20 or that the user does not wish to access another remote monitoring device 20, then the display process 160 exits at step 239.

Figure 7A:
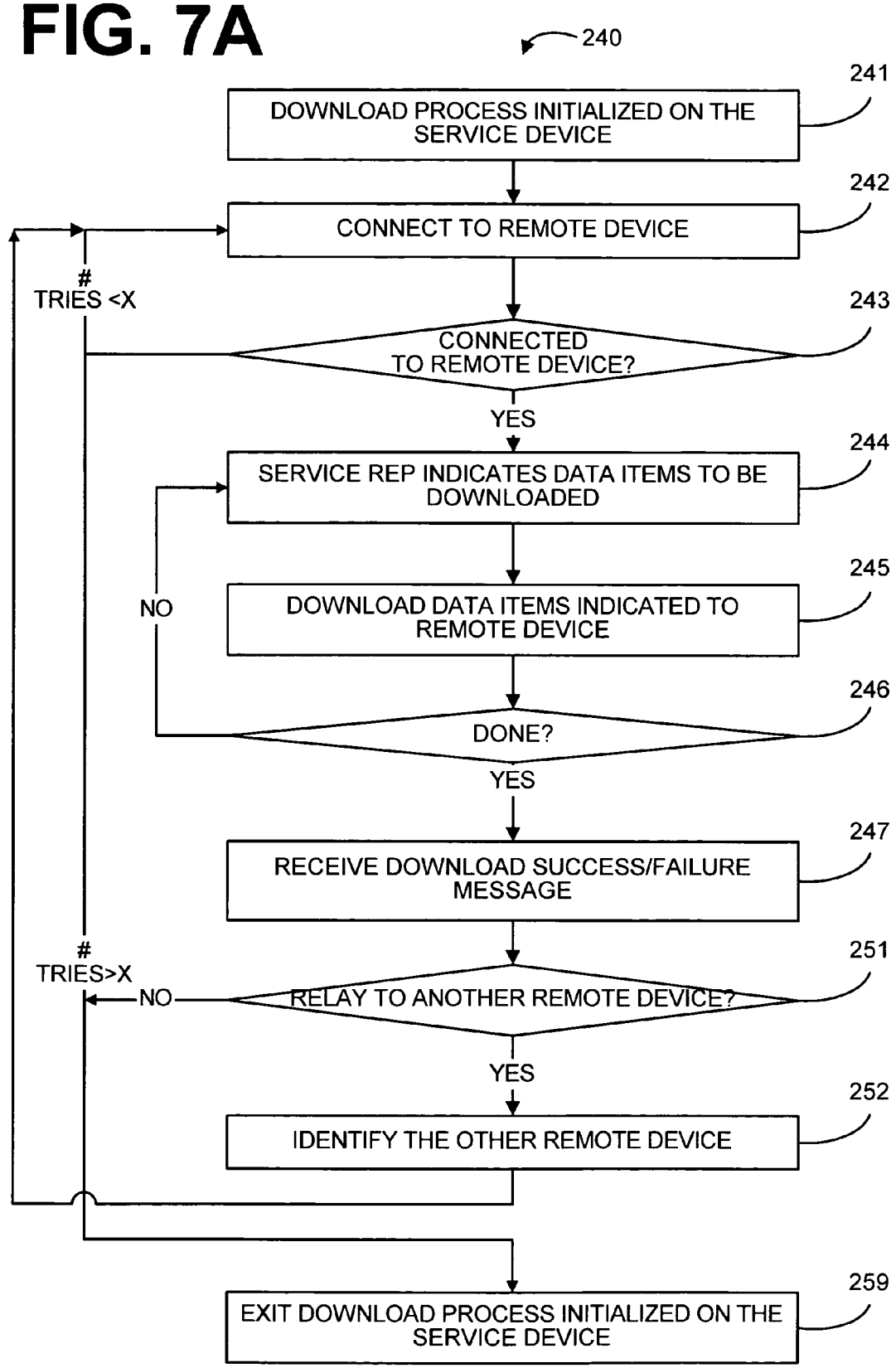
FIG. 7A is a flow chart illustrating an example of the operation of the download process utilized by the remote power monitoring system of the present invention, as shown in FIGS. 2A, 3A and 4A.

FIG. 7A is a flow chart illustrating an example of the operation of the download process 240 on service device 11 and utilized by the remote monitoring system 80 of the present invention, as shown in FIGS. 2A, 3A and 4A. The download agent 260 enables the service device 11 to download additional software or software changes to the remote monitoring device 20.

First at step 241, the download process 240 is initialized. This initialization includes the startup routines and process embedded in the BIOS of the service device 11. The initialization also includes the establishment of data values for particular data structures utilized in the download process 240.

At step 242, the download process 240 attempts to connect to the remote monitoring device 20. At step 243, it is determined if the download process 240 has successfully connected to the remote monitoring device 20. If it is determined at step 243 that a connection to the remote monitoring device 20 has not been successfully completed, then the service device 11 returns to repeat steps 242 and 243, provided that the maximum number of attempts has not been exceeded. However, if the maximum number of attempts has been exceeded, then the download process 240 exits at step 259.

However, if it is determined at step 243 that a connection to the remote monitoring device 20 has completed, then the download process 240 then enables a service representative to indicate the data items to be downloaded to the remote device at step 244. At step 245, the data items indicated are downloaded to the remote monitoring device 20. At step 246, it is determined if there are more data items to be downloaded. If it is determined that there are more data items to be downloaded, then the download process 240 returns to repeat steps 244 through 246. However, if it is determined at step 246 that there are no more data items to be downloaded, the download process 240 then proceeds to step 247.

At step 247, it is determined if there is a remote device connected to the currently connected remote monitoring device 20, and if the user wants to download data through the currently connected remote monitoring device 20 to another remote monitoring device 20. If it is determined at step 251 at there is another remote monitoring device 20 connected to the currently connected remote monitoring device 20, and that the user wants to download data through the currently connected remote monitoring device 20, then the other remote monitoring device 20 is identified at step 252. The download process 240 returns to repeat steps 241 through 251 for the other remote monitoring device 20. These actions will cause the currently connected remote monitoring device 20 to be utilized as a conduit to another remote monitoring device 20.

However, if it is determined at step 251 that either another remote monitoring device 20 is not a available through the currently connected to remote monitoring device 20 or that the user does not wish to access and another remote monitoring device 20, then the download process 240 exits at step 259.

Figure 7B:
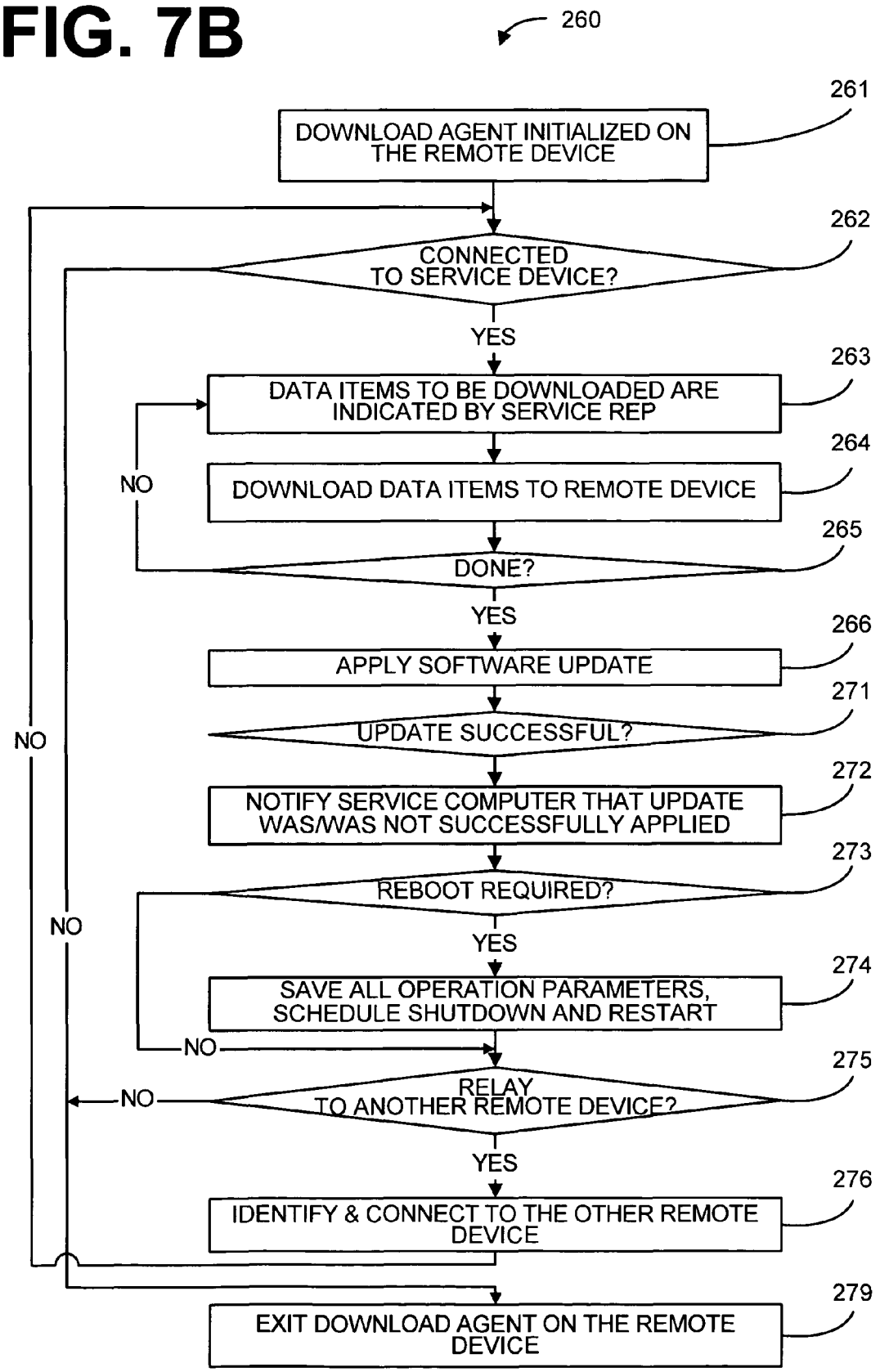
FIG. 7B is a flow chart illustrating an example of the operation of the download agent utilized in the remote monitoring device and utilized by the remote power monitoring system of the present invention, as shown in FIGS. 2B, 3B, 3C and 4B.

FIG. 7B is a flow chart illustrating an example of the operation of the download agent 260 utilized in the remote monitoring device 20 and utilized by the remote monitoring system 100 of the present invention, as shown in FIGS. 2B, 3B, 3C and 4B. The download agent 260 enables the remote monitoring device 20 to download additional software or software changes.

First at step 261, the download agent 260 is the initialized. This initialization includes the startup routines and processes embedded in the BIOS of the remote monitoring device 20. The initialization also includes the establishment of data values for particular data structures utilized in the download agent 260. At step 262, the download agent 260 determines if the remote monitoring device 20 is connected to a service device 11. If it is determined at step 262 that the remote monitoring device 20 is not connected to service device 11, then the download agent 260 exits at step 279.

However, if it is determined at step 262 that the remote monitoring device 20 is connected to the service device 11, then the download agent 260 allows the service representative to indicate the data items to be downloaded. At step 264, the download agent 260 then downloads the data from the service device 11.

At step 265, the download agent 260 determines if there are more data items to be downloaded. If it is determined at step 265 that there are more data to be downloaded, the download agent 260 then returns to repeat steps 263 through 265. However, if it is determined at step 265 that there is no additional data to be downloaded, then the download agent 260 applies the software update downloaded at step 266. At step 271, download agent 260 then determines if the software update was successfully applied. At step 272, the download agent 260 sends a notification to the service device 11 indicating whether or not the software update received was successfully applied. At step 273, the download agent 260 determines if a reboot is required because of the software update. If it is determined at step 273 that a reboot is not required, then the download agent 260 proceeds to step 275. However, if it is determined at step 273 that a reboot is required, then the download agent 260 saves all operation parameters, schedules the shutdown and restart of the remote monitoring device 20.

At step 271, it is determined if there is a remote monitoring device 20 connected to the currently connected remote monitoring device 20. The download agent 260 indicates the remote monitoring devices 20 that are connected to the currently connected remote monitoring device 20. The download agent 260 then determines if the user wants to download data through the currently connected remote monitoring device 20 to another remote monitoring device 20 by the user input identifying the other remote device to be connected to. If it is determined at step 275 that the user wants to download data through the currently connected remote monitoring device 20, the other remote monitoring device 20 is then identified at step 27. The download agent 260 returns to repeat steps 262 through 275 for the other remote monitoring device 20. These actions will cause the currently connected remote monitoring device 20 to be utilized as a conduit to another remote monitoring device 20.

However, if it is determined at step 275 that either another remote monitoring device 20 is not a available through the currently connected to remote monitoring device 20 or that the user does not wish to access another remote monitoring device 20, then the download agent 260 exits at step 279.

Figure 8A:
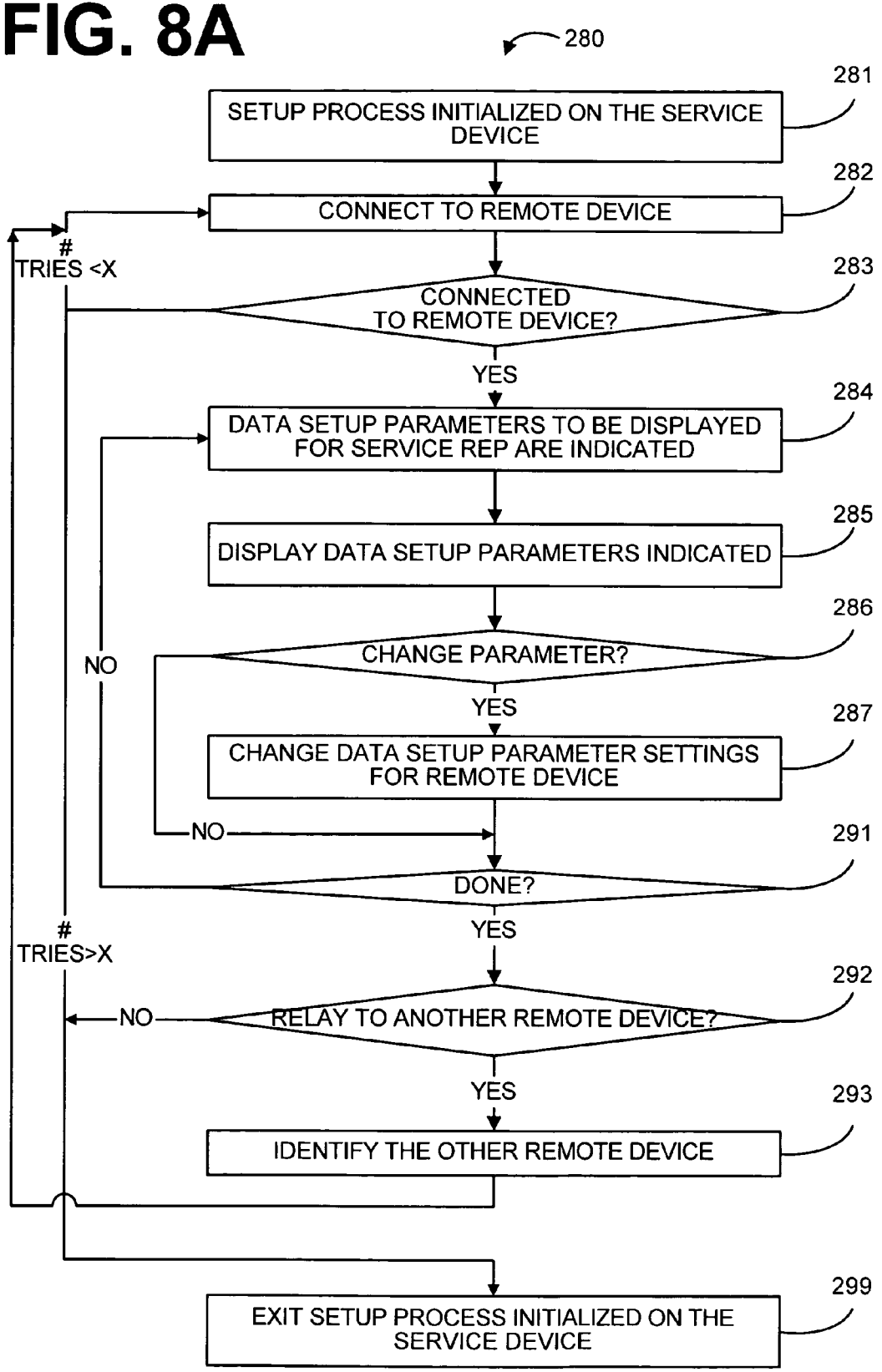
FIG. 8A is a flow chart illustrating an example of the operation of the set-up process utilized by the remote power monitoring system of the present invention, as shown in FIGS. 2A, 3A and 4A.

FIG. 8A is a flow chart illustrating an example of the operation of the setup process 280 on service device 11 and utilized by the remote monitoring system 80 of the present invention, as shown in FIGS. 2A, 3A and 4A. The setup process 280 enables modification of the system parameters for remote monitoring device 20 by a service representative.

First at step 281, the setup process 280 is the initialized. This initialization includes the startup routines and process embedded in the BIOS of the service device 11. The initialization also includes the establishment of data values for particular data structures utilized in the setup process 280.

At step 282, the setup process 280 attempts to connect to the remote monitoring device 20. At step 283, it is determined if the setup process 280 has successfully connected to the remote monitoring device 20. If it is determined at step 283 that a connection to the remote monitoring device 20 has not been successfully completed, then the service device 11 returns to repeat steps 282 and 283, provided that the maximum number of attempts has not been exceeded. However, if the maximum number of attempts has been exceeded, then the setup process 280 exits at step 299.

However, if it is determined at step 283 that a connection to the remote monitoring device 20 has completed, then the setup process 280 then enables a service representative to indicate the data items to be displayed from the remote monitoring device 20 at step 284. At step 285, the data items indicated are displayed from the remote monitoring device 20. At step 286, it is determined if parameters are to be changed. If it is determined at step 286 that parameters are not to be changed, the setup process 280 proceeds to step 291. However, if it is determined at step 286 that a change in parameters is to occur, then the setup process 280 changes the data setup parameter settings in the remote monitoring device 20 at step 287. At step 291, the setup process 280 determines if there are more setup parameters to be changed. If it is determined that there are more parameters to be changed, then the setup process 280 returns to repeat steps 284 through 291. However, if it is determined at step 291 that there are no more data items to be changed, the setup process 280 then proceeds to step 292.

At step 292, it is determined if there is a remote device connected to the currently connected remote monitoring device 20, and if the user wants to setup data through the currently connected remote monitoring device 20 to another remote monitoring device 20. If it is determined at step 292 that there is another remote monitoring device 20 connected to the currently connected remote monitoring device 20, and that the user wants to setup data through the currently connected remote monitoring device 20, then the other remote monitoring device 20 is identified at step 293. The setup process 280 returns to repeat steps 282 through 292 for the other remote monitoring device 20. These actions will cause the currently connected remote monitoring device 20 to be utilized as a conduit to another remote monitoring device 20.

However, if it is determined at step 292 that either another remote monitoring device 20 is not a available through the currently connected to remote monitoring device 20 or that the user does not wish to access another remote monitoring device 20, then the setup process 280 exits at step 299.

FIG. 8B is a flow chart illustrating an example of the operation of the setup agent 300 utilized in the remote monitoring device 20 and utilized by the remote monitoring system 100 of the present invention, as shown in FIGS. 2B, 3B, 3C and 4B. The setup agent 300 enables modification of the system parameters in the remote monitoring device 20 by a service representative.

First at step 301, the setup agent 300 is initialized. This initialization includes the startup routines and processes embedded in the BIOS of the remote monitoring device 20. The initialization also includes the establishment of data values for particular data structures utilized in the setup agent 300. At step 302, the setup agent 300 determines if the remote monitoring device 20 is connected to a service device 11. If it is determined at step 302 that the remote monitoring device 20 is not connected to service device 11, then the setup agent 300 exits at step 199.

However, if it is determined at step 302 that the remote monitoring device 20 is connected to the service device 11, then the setup agent 300 allows the service representative to indicate the system parameters to be displayed. At step 304, the setup agent 300 sends the system parameter indicated to the service device 11 at step 304.

At step 305, the setup agent 300 determines if it has received a data parameter change from the service representative on service device 11. If it is determined at step 305 that no data parameter change request is received, then the setup agent 300 proceeds to step 307. However, if it is determined at step 305 that a data parameter change request was received, then the setup agent 300 changes the data setup parameter setting for the remote monitoring device 20 as indicated in the request received.

At step 307, the setup agent 300 determines if there are more parameter change requests. If it is determined at step 307 that there are no parameter change requests, then the setup agent 300 proceeds to step 311. However, if it is determined at step 307 that there are more parameter change requests, the setup agent 300 then returns to repeat steps 303 through 307.

At step 311, the setup agent 300 determines if a system reboot is required do to a data parameter change. If it is determined at step 311 that no system reboot is required, then the setup agent 300 proceeds to step 313. However, if it is determined at step 311 that a system reboot is required, the setup agent 300 saves all operational parameters and then schedules a system shut down/restart at step 312.

At step 313, it is determined if there is a remote monitoring device 20 connected to the currently connected remote monitoring device 20. The setup agent 300 indicates the remote monitoring devices 20 that are connected to the currently connected remote monitoring device 20. The setup agent 300 then determines if the user wants to setup data through the currently connected remote monitoring device 20 to another remote monitoring device 20 by the user input identifying the other remote device to be connected to. If it is determined at step 313 that the user wants to setup data through the currently connected remote monitoring device 20, the other remote monitoring device 20 is then identified at step 314. The setup process 160 returns to repeat steps 302 through 313 for the other remote monitoring device 20. These actions will cause the currently connected remote monitoring device 20 to be utilized as a conduit to another remote monitoring device 20.

However, if it is determined at step 313 that either another remote monitoring device 20 is not a available through the currently connected to remote monitoring device 20 or that the user does not wish to access another remote monitoring device 20, then the setup process 160 exits at step 319.

Figure 9A:
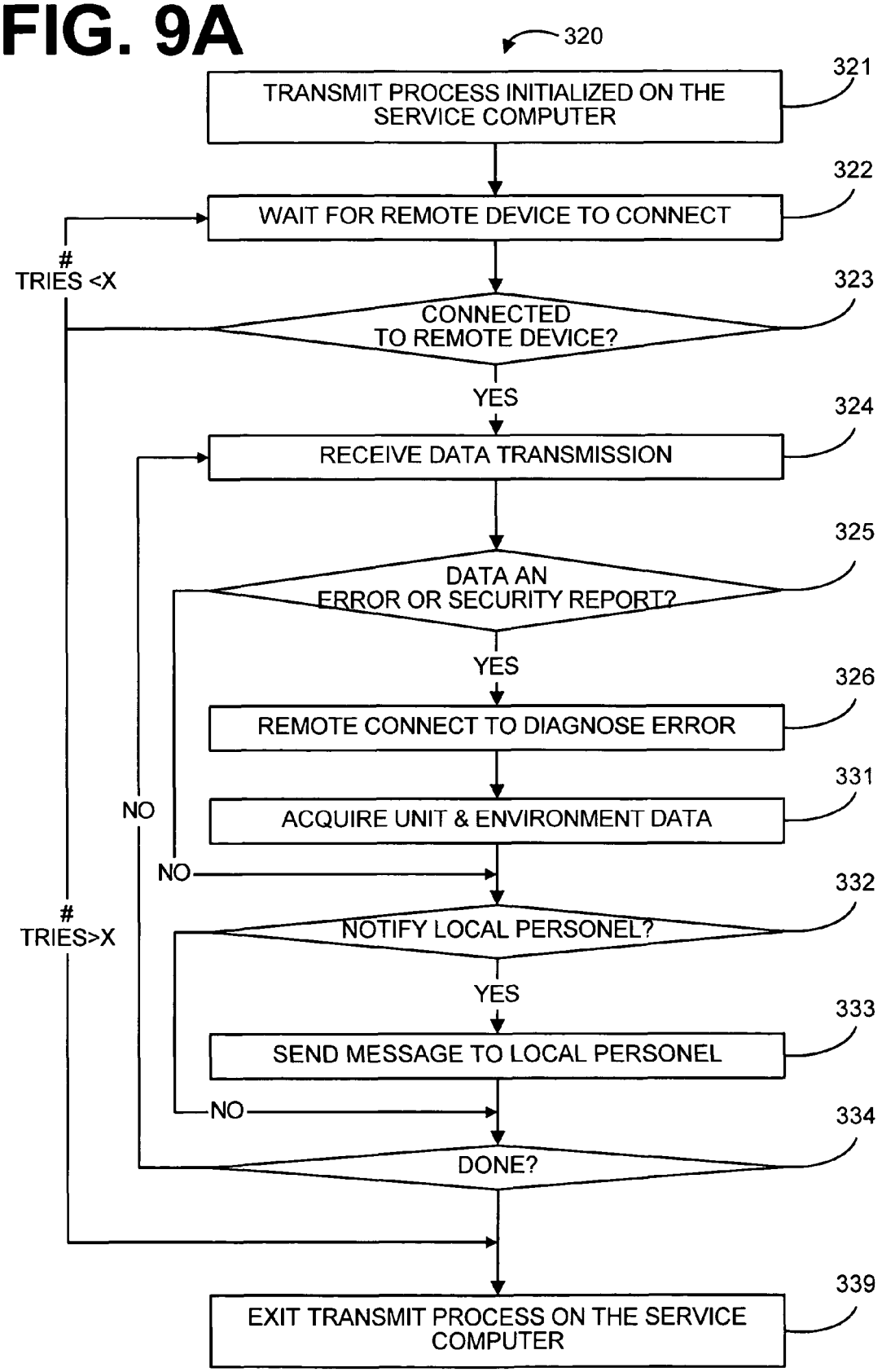
FIG. 9A is a flow chart illustrating an example of the operation of the network transmit process utilized by the remote power monitoring system of the present invention, as shown in FIGS. 2A, 3A and 4A.

FIG. 9A is a flow chart illustrating an example of the operation of the transmit process 320 on service device 11 and utilized by the remote monitoring system 80 of the present invention, as shown in FIGS. 2A, 3A and 4A. The transmit agent 340 provides for the transmission of data captured from power system device 7 and computed by remote monitoring device 20 to service device 11.

First at step 321, the transmit process 320 is the initialized. This initialization includes the startup routines and process embedded in the BIOS of the service device 11. The initialization also includes the establishment of data values for particular data structures utilized in the transmit process 320.

At step 322, the transmit process 320 attempts to connect to the remote monitoring device 20. At step 323, it is determined if the transmit process 320 has successfully connected to the remote monitoring device 20. If it is determined at step 323 that a connection to the remote monitoring device 20 has not been successfully completed, then the service device 11 returns to repeat steps 322 and 323 provided that the maximum number of attempts has not been exceeded. However, if the maximum number of attempts has been exceeded, then the transmit process 320 exits at step 339. However, if it is determined at step 323 that a connection to the remote monitoring device 20 has been completed, then the transmit process 320 receives a data transmission from the remote device at step 324.

At step 325, it is determined if the data transmission is due to an error or security report. If it is determined that the data transmission is due to an error or security report, then the transmit process 320 provides a remote connection to the remote monitoring device 20 in an attempt to diagnose the error at step 326. At step 331, the transmit process 320 acquires the remote monitoring device 20 unit and environmental data.

At step 332, the transmit process determines if a notification of local personnel is required. If it is determined at step 332 that notification of local personnel is not required, then the transmit process 320 proceeds to step 334. However, if it is determined at step 332 that notification of local personnel is required, then the transmit process 327 sends a message to local personnel notifying them of the problem. The recipients of this message can be but are not limited to, local technician, police, fire, power linemen, security, upper management, a remote monitoring service company, equipment manufacturer or support personnel, and the like. The message may utilize any number of current techniques, including but not limited to e-mail, voice mail, SMS messaging, fax, pre-recorded messages, and the like.

At step 334, the transmit process 320 determines if there more messages to be received. If it is determined at step 334 that there are more messages to be received, then the transmit process 320 returns to repeat steps 322 through 334. However, if it is determined at step 334 that no additional messages are to be received from remote monitoring device 20, then the transmit process 320 exits at step 339.

FIG. 9B is a flow chart illustrating an example of the operation of the transmit agent 340 utilized in the remote monitoring device 20 and utilized by the remote monitoring system 100 of the present invention, as shown in FIGS. 2B, 3B, 3C and 4B. The transmit agent 340 provides for the transmission of data captured from power system device 7 to service device 11.

First at step 341, the transmit agent 340 is the initialized. This initialization includes the startup routines and processes embedded in the BIOS of the remote monitoring device 20. The initialization also includes the establishment of data values for particular data structures utilized in the transmit agent 340. At step 342, the transmit agent 340 attempts to connect to a service device 11 through communication link. As stated previously, there are a number of communication links that can be utilized to perform this task. These links include, but are not limited to, Bluetooth, WiFi, cellular, optical, satellite, RF, plain old telephone system, Ethernet, internet, LAN, WAN or the like.

At step 343, the transmit agent 340 determines if the remote monitoring device 20 is connected to a service device 11. If it is determined at step 343 that the remote monitoring device 20 is not connected to service device 11, then the transmit agent 340 proceeds to step 352. However, if it is determined at step 343 that the remote monitoring device 20 is connected to the service device 11, then the transmit agent 340 captures the current state of the remote monitoring device 20 at step 344. At step 345, the environmental data for the remote monitoring device 20 is captured. This environmental data includes but is not limited to temperature, humidity, security factors, and the like. At step 344, the time period for data captured is indicated for the service representative. At step 345, the transmit agent 340 then transmits the data captured from the remote monitoring device 20 to the service device 11 at step 347.

At step 351, the transmit agent 340 determines if there are more data transmissions to be sent. If it is determined to step 351 that there are more data transmissions to be sent, the transmit agent 340 then returns to repeat steps 344 through 351. However, if it is determined at step 351 that there are no additional data transmissions to be sent, then the transmit agent 340 exits at step 359.

At step 352, it is determined if there is a remote monitoring device 20 connected to the currently connected remote monitoring device 20. The transmit agent 340 then determines if it is possible to transmit data through another remote monitoring device 20 to a service device 11. If it is determined at step 352 that it is possible to transmit data through another remote monitoring device 20, then identified at step 353. The transmit agent 340 returns to repeat steps 342 through 351 using the connection through the other remote monitoring device 20. These actions will cause the other remote monitoring device 20 to be utilized as a conduit for this remote monitoring device 20. However, if it is determined at step 352 that another remote monitoring device 20 is not available, then the transmit agent 340 exits at step 359.

Figure 10:
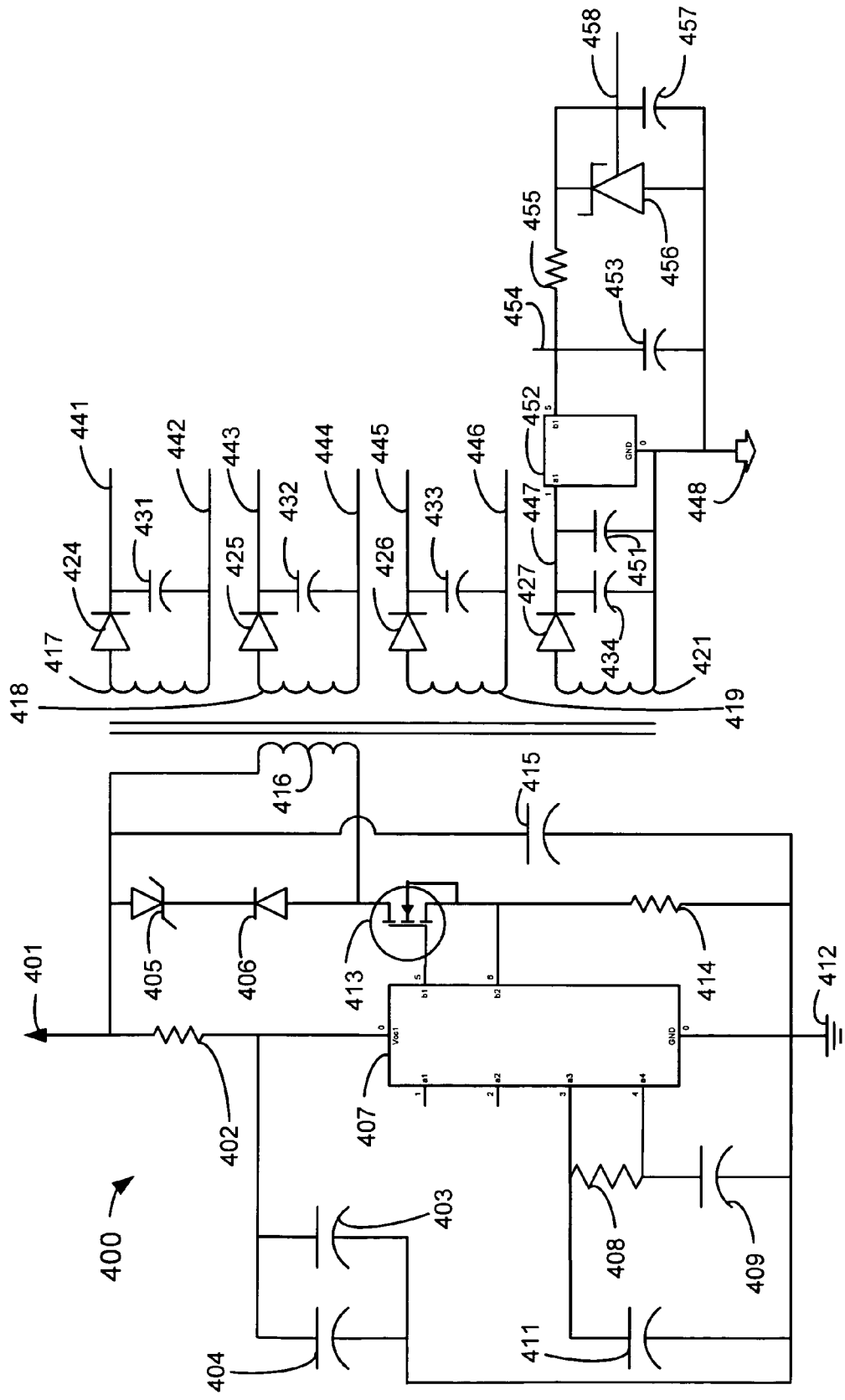
FIG. 10 is a schematic diagram illustrating an example of an isolated power supply 400 for the power quality monitoring the remote monitoring system 100 of the present invention, as shown in FIG. 2C.

FIG. 10 is a schematic diagram illustrating an example of an isolated power supply 400 for the power quality monitoring the remote monitoring system 100 of the present invention, as shown in FIG. 2C. The isolated power supply 400 converts the B+ input power supply voltage to four separate, isolated supply voltages V1-V4 B+, to power each of the four isolated voltage signal conditioning and A/D converter systems.

The illustrated example of a quad-isolated power supply 400 includes voltage outputs (441-448), and the regulated supply voltage and analog to digital (A/D) reference voltage circuitry for one channel (451-457). The isolators which isolate the signal and control lines to the A/Ds are herein described in further detail with regard to FIG. 15.

Switching power supply chip 407 uses transformer winding 416 to provide voltage to isolated transformer windings 417, 418, 419, and 421, whose outputs are rectified by diodes 424-427, and filtered by capacitors 431-434, to provide four isolated DC power outputs. An example of one set of isolated DC power output is leads 447 and 448. These outputs are regulated by circuitry in each voltage channel to provide clean DC power to each channel. Each set of isolated DC power outputs is isolated from other power outputs and well as the remaining circuitry of the remote monitoring device 100.

Components 451-457 are representative regulation circuits for a single channel, based on linear regulator 452, to create the regulated voltage signal 458. It is understood that the regulation circuitry would be duplicated for each channel being monitored, for example connections to lines for 441-446. It is understood that other configurations of circuitry may be utilized to obtain the same result.

Figure 11:
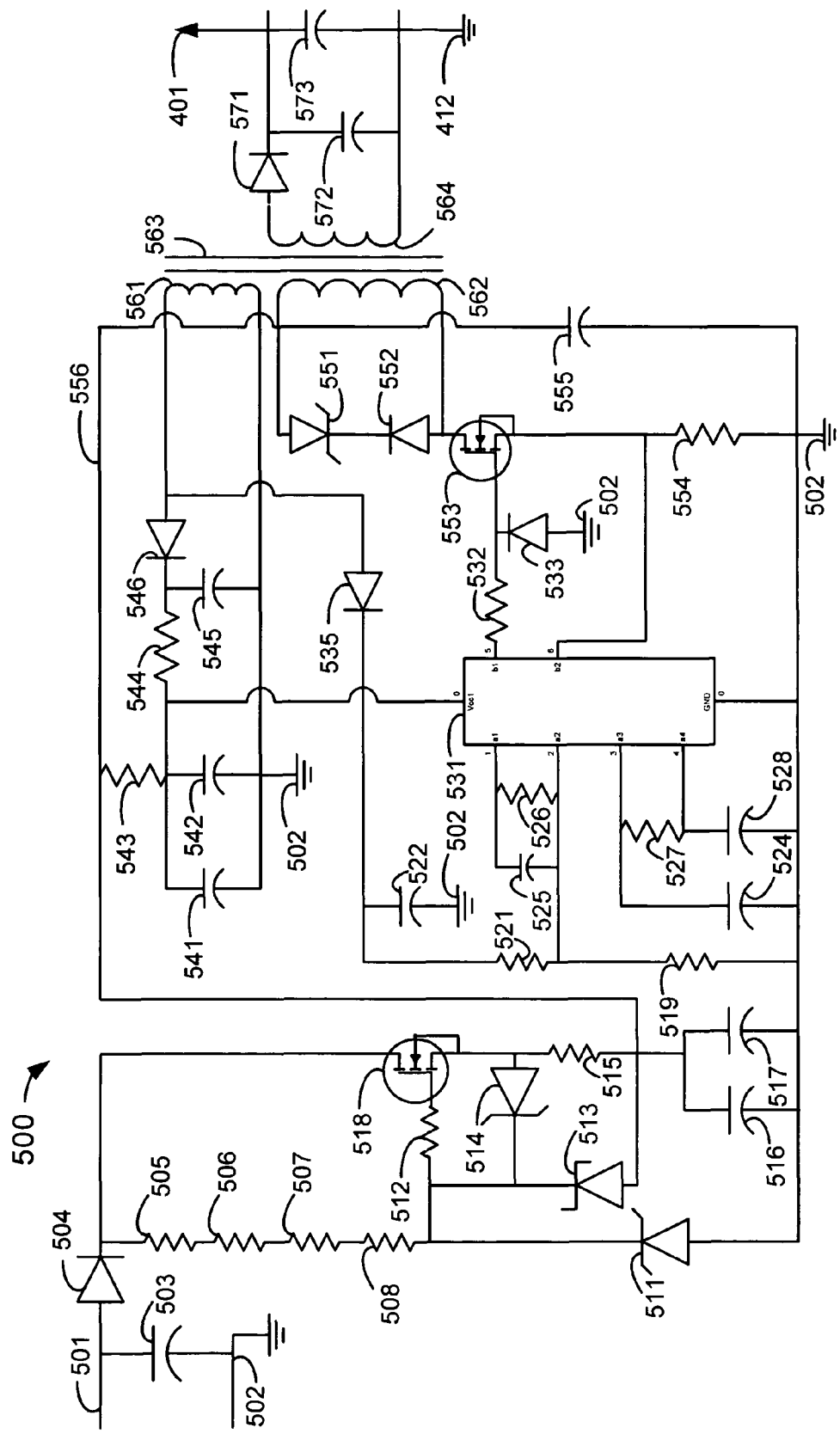
FIG. 11 is a schematic diagram illustrating an example of a pre-regulator component in the remote power monitoring system of the present invention, as shown in FIG. 2B.

FIG. 11 is a schematic diagram illustrating an example of a pre-regulator component 500 in the power quality monitoring the remote monitoring system 100 of the present invention, as shown in FIG. 2B. The pre-regulator components 500 converts AC input voltage to a rectified DC voltage.

Capacitor 503 provides across-the-line noise filtering. Rectifier diode 504 converts the bipolar AC input voltage on line 501 to half-wave rectified DC voltage, thereby producing a voltage magnitude at the cathode of rectifier diode 504 equal to the peak voltage of the input AC supply on line 501. This half-wave rectified DC voltage feeds gate bias circuitry for a series pass regulator implemented by FET 518. For each positive half cycle of the input AC waveform, the voltage rises on the input or drain of FET 518 and the gate of FET 518 as provided by bias resistors 505, 506, 507, and 508. As the voltage rises on the gate of FET 518, producing sufficient gate-to-source voltage for FET 518 conduction, FET 518 passes current to the pre-regulator output (i.e. power supply load) through current limiting resistor 515, thereby charging bulk storage capacitors 516 and 517. It is understood that other configurations of circuitry may be utilized to obtain the same result.

As the input AC voltage on line 501 continues to rise, Zener diode 511 will eventually conduct, limiting the rectifier diode 504 gate voltage to approximately 185V. As the rectifier diode 504 output (source lead) rises and approaches this gate-limited voltage, rectifier diode 504 begins to turn off due to the reducing gate-to-source voltage. This limits the pre-regulator output voltage across capacitors 516 and 517 to approximately 180 VDC. In this manner the power supply output is self-limiting or regulating, as determined by the voltage of Zener diode 511. It is understood that other configurations of circuitry may be utilized to obtain the same result.

Components 512-514 comprise a protection circuit for FET 518 by limiting the gate-to-source voltage and gate current of FET 518. Resistor 515 further protects FET 518 by limiting the inrush current through FET 518 on supply startup, especially at input AC line voltages approaching 600V. It is understood that other configurations of circuitry may be utilized to obtain the same result.

Components 541 through 546 interact with transformer winding 561. Diode 546, resistor 543, and capacitors 541, 542 and 545 form a bootstrap power supply to power switching regulator 531. It is understood that other configurations of circuitry may be utilized to obtain the same result.

Components 522-535 and 551-555 interact with transformer winding 562. These components are used by power switching regulator 531 and transformer 563 to step the DC voltage 556 to a low AC voltage across winding 564. This is rectified by diode 571 and filtered by capacitors 572 and 573 for creating B+ voltage 401 (FIG. 10) which feeds to all other circuits. It is understood that other configurations of circuitry may be utilized to obtain the same result.

Figure 12:
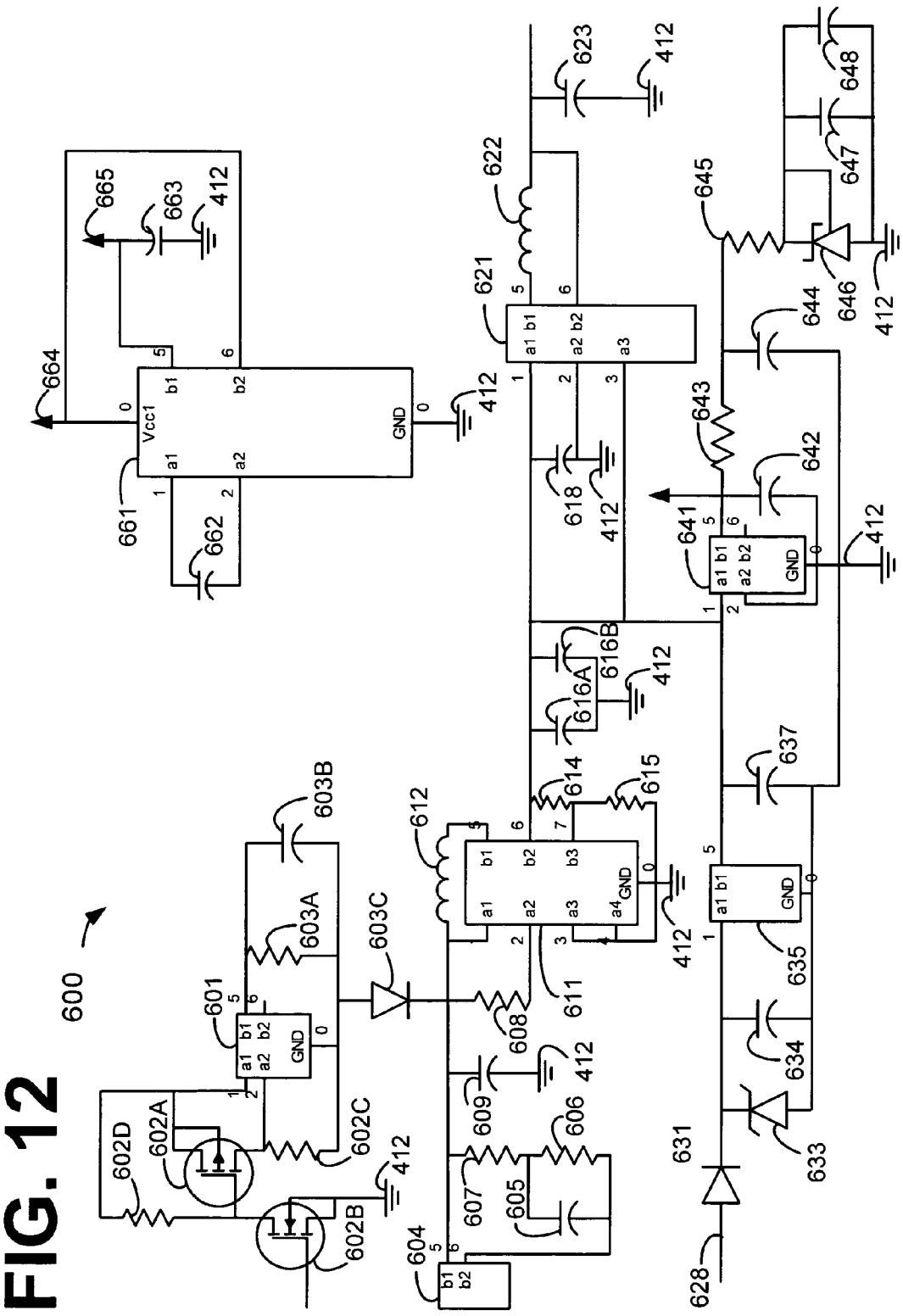
FIG. 12 is a schematic diagram illustrating an example of a multi-source power supply component in the remote power monitoring system of the present invention, as shown in FIG. 2B.

FIG. 12 is a schematic diagram illustrating an example of a multi-source power supply component 600 in the power quality monitoring of the remote monitoring system 100 of the present invention, as shown in FIG. 2C. This multi-source power supply component 600 can supply a regulated voltage to the main circuitry, and is fed from multiple sources, including an external wall adapter, an internal rechargeable battery, and the voltage being monitored on one channel. Each of these sources feeds into a separate power supply, which regulates the voltage to a level suitable for feeding the supply in FIG. 12. Electrical isolation is maintained in each power source and grounds (412, 442, 444, 446, 448 (FIG. 10) & 502 (FIG. 11)), as needed.

Power can be supplied from a battery 604, such as for example but not limited to, one or more rechargeable or non-rechargeable batteries. Examples of rechargeable batteries include, but are not limited to, Nicad, Lithium-Ion or Nickel-Metal-Hydride batteries. Examples of non-rechargeable batteries include but are not limited to alkaline or lithium batteries. Voltage from battery 604 enters through a connector and is doubled by voltage converter 611 to provide a 5.5V DC voltage into the common DC bus B+ voltage 401 (FIG. 10)

which is read by the DSP 1010 (FIG. 16A) to determine remaining battery life. Capacitor 605 smoothes the value to allow lower noise A/D readings.

Regulator 601 is used to provide a constant current charge into the battery; this chip is controlled by the DSP 1010 so that charging does not occur when the remote monitoring device 20 is operating under battery power. The switching FETs 6021A and 602B are used in conjunction with the resistors 602C and 602D to enable DSP 1010 to control regulator 601. The resistor 603A is utilized to sets the charge current given regulator 601 fixed output voltage. Capacitor 603B is utilized to provide stability for the output of regulator 601. Diode 603C is utilized to prevent current from following from the battery 604 into regulator 601. It is understood that other configurations of circuitry may be utilized to obtain the same result.

A wall adapter or other DC input 628, referred to hereafter as input 628, may also power the remote monitoring device 20 through diode 631. This input 628 comes from an external connector on the device. A voltage of up to 15V may be applied here, and is regulated to 5V by linear regulator 635 through capacitor 634 and Zener diode 633. Diode 636 diode-OR's the output from linear regulator 635 into B+ voltage 401. The B+ voltage 401 may also be fed from the output of FIG. 11. In any case, the B+ voltage 401 then feeds the isolated system in FIG. 10, and regulators 621 and 641 in FIG. 12.

Regulator 621 is a switching regulator which provides 1.8V DC to the DSP core and Bluetooth module core, while regulator 641 provides the preferred 3V DC to other circuitry including the SRAM 1121 and digital logic. This 3V power is filtered by resistor 643 and capacitor 644 to provide a quiet DC voltage to power the analog electronics used for current signal conditioning. It is understood that other configurations of circuitry may be utilized to obtain the same result.

In an alternative embodiment, it is considered a novel aspect that the B+ voltage 401 may be fed from either the wall transformer from FIG. 12, AC line voltage from FIG. 11, or the battery from FIG. 12, while maintaining isolation as needed for safety.

Another circuit is a power converter 661-665 for converting positive power components into negative power components. This circuit is utilized to power external accessories, and not utilized for the components within the preferred invention as illustrated in FIGS. 10 through 16B.

FIG. 13 is a schematic diagram illustrating an example of a transmitter component 700 in the power quality monitoring the remote monitoring system 100 of the present invention, as shown in FIG. 2B. Preferably, the transmitter component 700 includes at least one mode of wireless communication. In the illustrated example shown below, the wireless communication described is the short-range Bluetooth communication system. However, other types of wireless communication can be utilized in conjunction with or instead of the Bluetooth communication system.

The transmitter component 700 in this illustrated embodiment has both a wireless Bluetooth interface comprising components 701-709, and a wired RS-232 port comprising components 711-717. These interfaces are multiplexed with logic gates 725 and 724, and resistor 722. Both interfaces are connected to the digital signal processor (DSP) 1010 (FIG. 16A), allowing communication through either interface. DSP 1010 can also act as a bridge between the interfaces.

In addition, each interface (for example Bluetooth or RS-232) may be shut down at DSP 1010 control in order to save power in certain modes of operation. Module 701 is preferably an embedded Bluetooth module which contains an on-board processor, FLASH memory, and RF interface and modulation circuitry (not shown). Module 701 uses antenna 709 to transmit and receive RF signals.

Capacitors 703(A-C) filter the power supply lines so that RF transmission does not impose noise onto them. I/O lines 702(A-H) are used to interface with the DSP so the DSP and Bluetooth module can exchange setup and control parameters. The DSP can set Bluetooth parameters such as, but not limited to, a discovery name, idle time, baud rate, and other radio parameters via these I/O lines 702(A-H). The Bluetooth module can signal to the DSP 1010 that it is connected to a Bluetooth master, and is ready for data transmission. In the preferred embodiment, the DSP 1010 can thus sense whether inbound data is coming in through the Bluetooth module 701 or the RS-232 port.

Other communication and control lines from module 701 include a universal serial bus control lines 702 (I-J) and PC and pulse control modulation (PCM) signals 702 (K-N). In an alternative embodiment, the PCM signals 702(K-N) can be used for voice or analog data communication. Module 701 further includes communication and control lines for UART connections 702 (S-V), SPI control lines 702 (O-R). It is understood that other configurations of circuitry may be utilized to obtain the same result.

Transceiver 712 is a voltage shifting chip which converts the RS-232 signal levels from connector 711 to standard logical levels. Transceiver 712 utilizes charge pump capacitors 713-717 to generate the RS-232 voltage levels. The logical-level signals are fed into logic gates 724 and 725. These logic gates combine the outputs from the Bluetooth module 701 and transceiver 712 so that only one may signal the DSP 1010 at any one time. It is understood that other configurations of circuitry may be utilized to obtain the same result.

Figure 14:
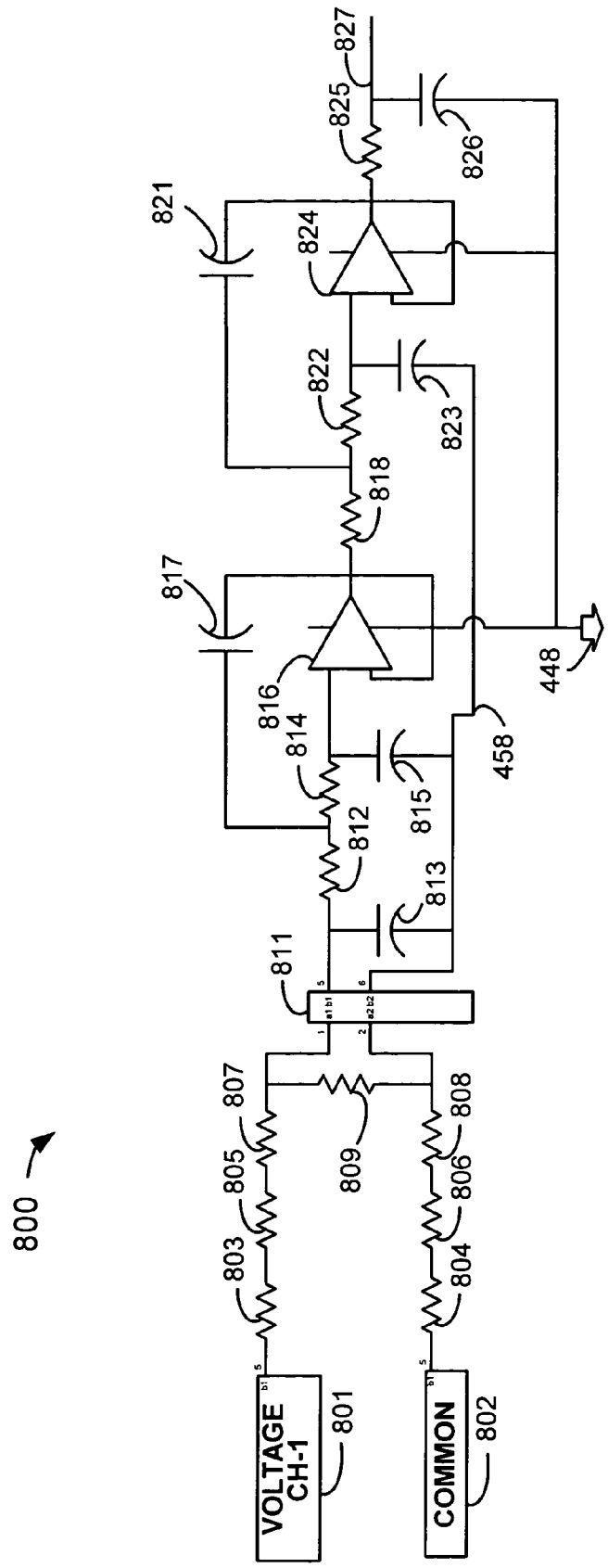
FIG. 14 is a schematic diagram illustrating an example of a voltage input and scaling component in the remote power monitoring system of the present invention, as shown in FIG. 2B.

FIG. 14 is a schematic diagram illustrating an example of a voltage input and scaling component 800 in the power quality monitoring of the remote monitoring system 100 of the present invention, as shown in FIG. 2C. This signal chain converts the 600V max AC input into a low-voltage scaled, filtered signal suitable for digitizing by the voltage A/D converter for that channel.

Voltage is applied to terminals 801 and 802. The divider resistors 803-809 scale the voltage from up to 600V down to around 1V that is suitable for further conditioning. It is understood that other configurations of circuitry may be utilized to obtain the same result. These divider resistors 803-809 also form an RC filter that protects isolators 931-932 and 933-934 (FIG. 15) from high voltage transients, in combination with transformer winding 421 (FIG. 10). Requirements for EEC Cat III demand protection from 15,000 volt transients; whereas the isolators used are only rated to 4000 volts, since higher voltage isolators suitable for this application do not exist.

The resistance of these divider resistors 803-809 combined with the winding capacitance of transformer winding 421 forms an RC circuit which filters the transient such that the peak voltage seen by the isolators is within their specifications. It is understood that multiple voltage input and scaling components are needed to monitor additional signals. For instances, at least three voltage input and scaling components are needed to monitor 3 phase circuits.

Figure 15:
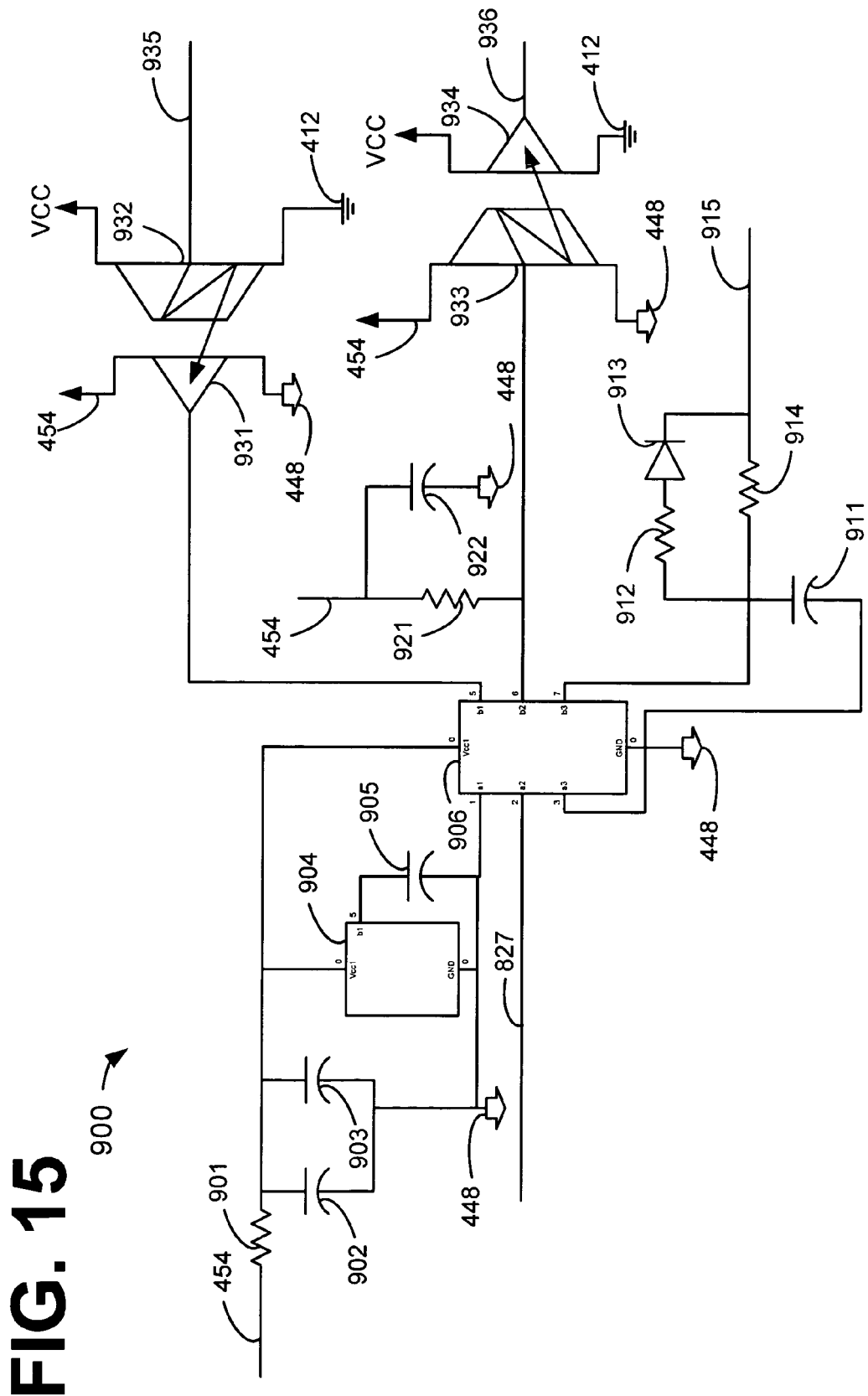
FIG. 15 is a schematic diagram illustrating an example of an A/D converter component in the remote power monitoring system of the present invention, as shown in FIG. 2B.

The circuitry 811-826 provides low pass filtering and analog signal conditioning using conventional techniques, before feeding the voltage signal 827 into the A/D converter 906 in FIG. 15. It is understood that other configurations of circuitry may be utilized to obtain the same result.

Current filtering and signal conditioning circuitry may be implemented utilizing well-known components or component 811 through 826 of the voltage input and scaling component 800 by utilizing slightly different values for the resistors and capacitors. When utilizing the circuit diagram of the voltage input and scaling component 800 for current filtering and signal conditioning, it would be obvious to one of ordinary skill in the art as to the approximate component values to acquire the desired bandwidth.

The FIG. 15 is a schematic diagram illustrating an example of an A/D converter component 900 in the power quality monitoring of the remote monitoring system 100 of the present invention, as shown in FIG. 2C. This device digitizes the incoming analog signal for processing with the signal processing component of FIG. 16A, using conventional techniques.

In order to achieve the required size and performance, three conventional control lines needed to interface the A/D converter to the signal processor could not be used. In the preferred embodiment, a novel multiplexing scheme was devised to derive the A/D chip select signal for A/D converter 906 from the A/D clock signal for A/D converter 906, using a combination of RC delays and a diode, as shown in FIG. 15.

When the clock signal goes low, the RC constant formed by capacitor 911 and resistor 912 insures that the chip select line on A/D converter 906 goes low for at least 55 nanoseconds after the clock line, thus meeting required setup times on the A/D converter. As the A/D clock toggles high and low, the RC time constant formed by resistor 914 and capacitor 911, in combination with diode 913 insures that the chip select line stays low during the entire A/D conversion sequence. This is provided that the clock period is significantly faster than the RC time of approximately 6 microseconds.

When the conversion is complete, the clock line on A/D converter 906 gets asserted (i.e. goes high), and approximately 6 microseconds later, the chip select on A/D converter 906 also gets asserted (i.e. goes high), thus deselecting the A/D converter 906, and making it ready for a new conversion. In this way, a separate chip select signal is not needed, and a prior required third digital isolator is eliminated. It is understood that other configurations of circuitry may be utilized to obtain the same result.

Digital isolators represented by component pair 931-932 and 933-934 maintain galvanic isolation between each of the voltage channels and the remaining circuitry of the remote monitoring device 100.

Figure 16A:
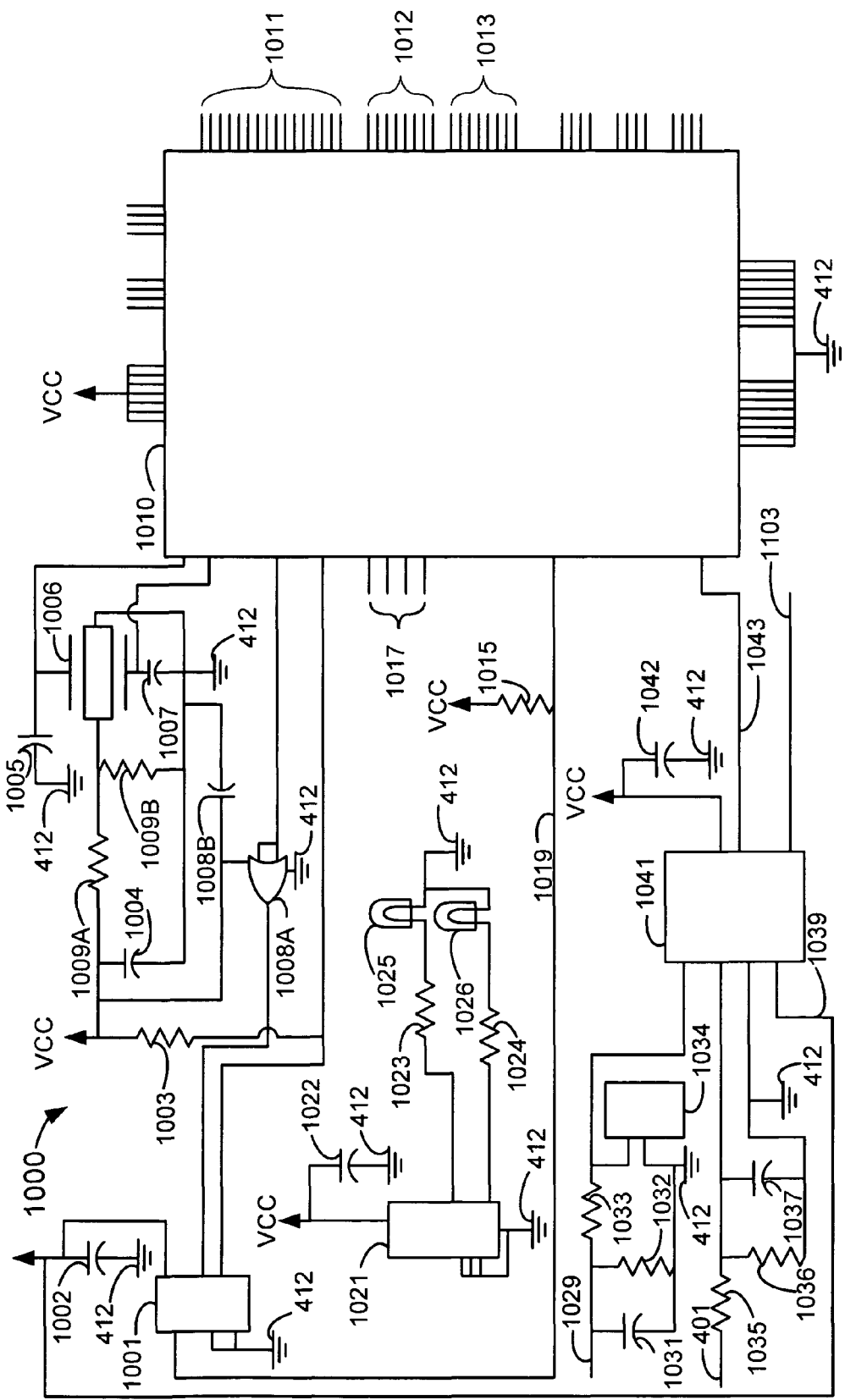
FIG. 16A is a schematic diagram illustrating an example of a signal processor component in the remote power monitoring system of the present invention, as shown in FIG. 2B.

FIG. 16A is a schematic diagram illustrating an example of a signal processor component in the power quality monitoring of the remote power monitoring system of the present invention, as shown in FIG. 2B. This processor (DSP) 1010 handles all signal processing, measurement, recording, and communications functions. It also decides when to switch to rechargeable battery power (based on the absence of power supply voltage from a wall adapter or voltage on channel one), and when to shut itself off to avoid complete discharge of the battery.

In the preferred embodiment, a real-time clock 1001 is used to store accurate system time. This real-time clock 1001 is battery-backed by a 3V lithium battery in the preferred embodiment. The once-per-second output 1019 from real-time clock 1001 is fed to the DSP through pull-up resistor 1015. The DSP 1010 uses this once-per-second output 1019 from real-time clock 1001 to start the one-second tasks.

An input/output (I/O) expander 1021 provides for extra I/O lines for the DSP 1010. These extra I/O lines can be utilized for expanded addresses for data lines. The light emitting diodes (LEDs) 1025 and 1026 provide indicators to the user of device state through different color combinations and blinking rates. In the preferred embodiment, LEDs 1025 and 1026 are integrated into a single LED. Other outputs from I/O expander 1021 include charge and shutdown lines (not shown) to the rechargeable battery 1034, and interface lines (not shown) to the wireless Bluetooth module. It is understood that other configurations of circuitry may be utilized to obtain the same result.

A power supervisory chip 1041 provides the master reset output 1103, and gives a low power warning to the DSP 1010 through the PFO line 1043. The power supervisory chip 1041 senses the system VCC voltage, and the B+ voltage 401 (FIG. 10) through the resistive divider of resistors 1035 and 1036, which is filtered by capacitor 1037. If the B+voltage 401 drops to a low level, the power supervisory chip 1041 asserts the warning on PFO line 1043 to the DSP 1010.

The power supervisory chip 1041 also feeds the 3V battery 1034 voltage to the SRAM and real time clock 1001 through the VBACK line 1039. When the VCC voltage drops to a low level, the power supervisory chip 1041 switches the VBACK line 1039 from VCC to the voltage in battery 1034 on line 1029. This battery voltage is also divided by resistors 1032 and 1033 for sensing by the DSP 1010 through an auxiliary A/D. The user is warned then the voltage in battery 1034 is too low to maintain memory and time. It is understood that other configurations of circuitry may be utilized to obtain the same result.

The crystal 1006 forms an oscillator using capacitors 1005 and 1007, along with the DSP 1010. This oscillator drives the DSP 1010, and may also be the reference oscillator for any frequency measurement. It is understood that other configurations of circuitry may be utilized to obtain the same result.

Memory lines 1011 and 1013 provide addressing for SRAM 1121 and flash 1101 memory (FIG. 16B); while data lines 1012 provide data to the memory devices. The memory is herein described in further detail with regard to the description of FIG. 16B.

Figure 16B:
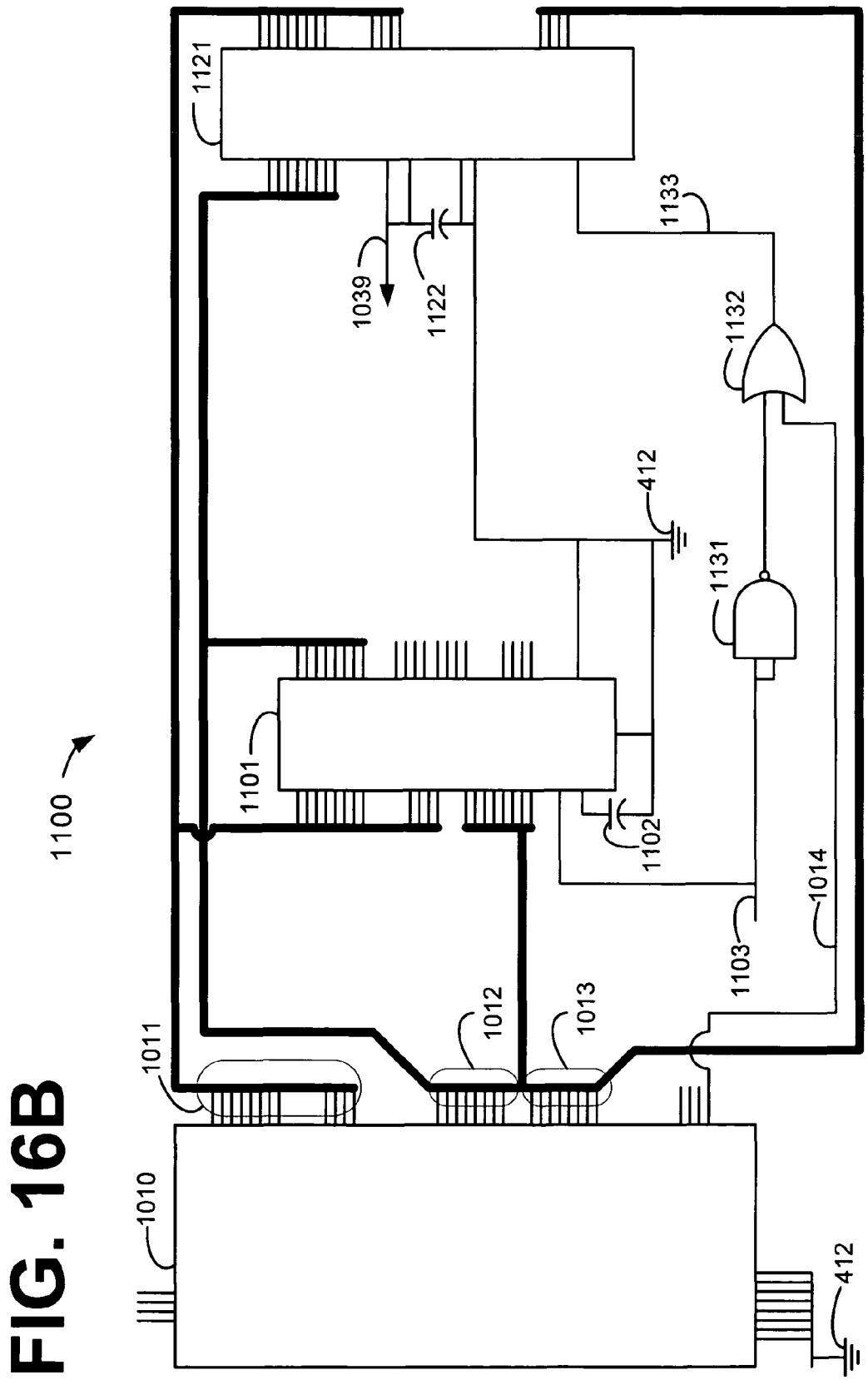
FIG. 16B is a schematic diagram illustrating an example of a fast non-volatile memory and static memory components connect to the signal processor component in the remote power monitoring system of the present invention, as shown in FIG. 2B.

FIG. 16B is a schematic diagram illustrating examples of a fast non-volatile memory, i.e. flash memory 1101, and static memory 1121 components. These components connect to the DSP 1010 in the power quality monitoring of the remote monitoring system 100 of the present invention, as shown in FIG. 2B. Flash memory 1101 and static memory 1121 components examples are illustrated with a limited number of address and data lines for simplicity of illustration only, and it is understood that any number of such address and data line are utilized in these components. This memory 1100 is used to store executable code, scratchpad variables, setup parameters, status, and recorded data.

In the preferred embodiment, flash memory 1101 stores both firmware code and recorded data using two independent banks. Calibration data can also stored in flash memory 1101, in a separate memory page. SRAM chip 1121 is utilized to store other recorded data, in addition to scratchpad and temporary values. Data which changes quickly (histogram data, waveform capture, etc.) are stored in SRAM 1121, while data which changes or is updated slowly is stored the flash 1101. Preferably, data is stored as stripchart data. Gates 1131 and 1132 insure that the SRAM 1121 is not enabled during a reset condition using not reset signal 1103 to avoid false writes during startup or bad power conditions. The not reset signal 1103 is generated by the power supervisory chip 1041 (FIG. 16A). The flash memory 1101 has internal circuitry to utilize the not reset signal 1103.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

It will be apparent to those skilled in the art that many modifications and variations may be made to embodiments of the present invention, as set forth above, without departing substantially from the principles of the present invention. All such modifications and variations are intended to be included herein within the scope of the present invention, as defined in the claims that follow.

What is claimed is:

1. A method comprising:
    detecting a power condition of a power device through a remote monitoring device;
    storing information describing the power condition of the power device;
    transmitting the information of the power condition to a service device for analysis, the service device being located remotely from the power device;
    displaying at least part of the information; and
    receiving a request from the service device to adjust a system parameter in the power device.

2. The method of claim 1, further comprising the step of:
    formatting the information describing the power condition of the power device.

3. The method of claim 1, further comprises the step of:
    computing the information describing the power condition of the power device.

4. The method of claim 1, further comprising the steps of:
    adjusting the system parameter in the power device.

5. The method of claim 4, further comprising the step of:
    providing adjustment of the system parameter in a connected remote power device.

6. The method of claim 3, wherein the information computed is selected from the group consisting of raw sampled waveform values, RMS voltage, current, symmetrical components, phasors, real power, apparent power, harmonics, phase angle, reactive power, power factor, displaced power factor, total harmonic distortion, total power quantities, total real power, reactive power, total power factors, phase angles, cycle histograms, cycle event changes, flicker, abnormal voltages, power outages, power device parameters, logs, current device status, set up parameters, calibration data, temperature, humidity, pressure, smoke content, security status, transformer temperature, oil level, and status.

7. The method of claim 1, further comprising the step of:
    sending an alert if a alert condition occurs in operation of the power device.

8. The method of claim 1, further comprising the step of:
    downloading control instructions to a monitoring device.

9. The method of claim 1, further comprising the step of:
    providing downloaded control instructions to a connected remote monitoring device.

10. The method of claim 1, further comprising the step of:
    sending an alert if an alert condition occurs in operation of the power device.

11. The method of claim 1, further comprising the step of:
    storing performance information describing the power condition of the power device.

12. A system comprising:
    a remote device comprising a power condition detection circuitry;
    a memory circuitry that stores information describing the power condition of a power device;
    a transmission circuitry that transmits the information of the power condition to a service device for analysis, the service device being located remotely from the power device, and
    a request receiver that receives a request from the service device to adjust a system parameter in the power device.

13. The system of claim 12, wherein the transmission circuitry further comprises:
    a transceiver that transmits information of a power condition detected to the service device.

14. The system of claim 12, further comprising:
    a processor circuitry that computes the information describing the power condition of the power device.

15. The system of claim 14, wherein the information computed is selected from the group consisting of raw sampled waveform values, RMS voltage, current, symmetrical components, phasors, real power, apparent power, harmonics, phase angle, reactive power, power factor, displaced power factor, total harmonic distortion, total power quantities, total real power, reactive power, total power factors, phase angles, cycle histograms, cycle event changes, flicker, abnormal voltages, power outages, power device parameters, logs, current device status, calibration data, set up parameters, temperature, humidity, pressure, smoke content, security status, transformer temperature, oil level, and status.

16. The system of claim 12, further comprising:
    a storage circuitry that stores performance information describing the power condition of the power device.

17. The system of claim 12, further comprising:
    an instruction transmission unit that transmits at least one instruction to adjust the system parameter in the power device.

18. The system of claim 13, wherein the transceiver receives a request to adjust a system parameter in a connected remote power device, and transmits at least one instruction to adjust the system parameter in the connected remote power device.

19. The system of claim 13, wherein the transceiver sends an alert if an alert condition occurs in operation of the power device.

20. The system of claim 13, wherein the transceiver downloads control instructions to a monitoring device.

21. The system of claim 13, wherein the transceiver provides downloaded control instructions to a connected remote monitoring device.

22. A system comprising:
    means for detecting a power condition of a power device;
    means for storing information describing the power condition of the power device;
    means for transmitting the information of the power condition to a service device for analysis, the service device being located remotely from the power device, and
    means for receiving a request from the service device to adjust a system parameter in the power device.

23. The system of claim 22, wherein the transmitting means further comprises:
    means for formatting the information describing the power condition of the power device.

24. The system of claim 22, further comprising:
    means for computing the information describing the power condition of the power device.

25. The system of claim 22, wherein the transmitting means further comprises:
    means for adjusting the system parameter in the power device.

26. The system of claim 25, wherein the transmitting means further comprises:
   means for providing adjustment of the system parameter in a connected remote power device.

27. The system of claim 22, wherein the information computed is selected from the group consisting of raw sampled waveform values, RMS voltage, current, symmetrical components, phasors, real power, apparent power, harmonics, phase angle, reactive power, power factor, displaced power factor, total harmonic distortion, total power quantities, total real power, reactive power, total power factors, phase angles, cycle histograms, cycle event changes, flicker, abnormal voltages, power outages, power device parameters, logs, current device status, set up parameters, calibration data temperature, humidity, pressure, smoke content, security status, transformer temperature, oil level, and status.

28. The system of claim 22, wherein the transmitting means further comprises:
   means for sending an alert if an alert condition occurs in operation of the power device.

29. The system of claim 22, wherein the transmitting means further comprises:
   means for downloading control instructions to a monitoring device.

30. The system of claim 22, wherein the transmitting means further comprises:
   means for providing downloaded control instructions to a connected remote monitoring device.

31. The system of claim 22, wherein the transmitting means further comprises:
   means for sending an alert if an alert condition occurs in operation of the power device.

32. The system of claim 22, further comprising:
   means for storing performance information describing the power condition of the power device.

33. A non-transitory computer readable medium containing computer instructions stored therein for causing a computer processor to perform:
   detecting a power condition of a power device through a remote monitoring device;
   storing information describing the power condition of the power device;
   transmitting the information of the power condition to a service device for analysis, the service device being located remotely from the power device;
   causing at least part of the information to be displayed; and
   receiving a request from the service device to adjust a system parameter in the power device.

34. The computer readable medium of claim 33, further comprising:
   formatting the information describing the power condition of the power device.

35. The computer readable medium of claim 33, further comprising:
   computing the information describing the power condition of the power device.

36. The computer readable medium of claim 33, further comprising:
   adjusting the system parameter in the power device.

37. The computer readable medium of claim 36, further comprising:
   providing adjustment of the system parameter in a connected remote power device.

38. The computer readable medium of claim 33, wherein the information computed is selected from the group consisting of raw sampled waveform values, RMS voltage, current, symmetrical components, phasors, real power, apparent power, harmnonics, phase angle, reactive power, power factor, displaced power factor, total harmonic distortion, total power quantities, total real power, reactive power, total power factors, phase angles, cycle histograms, cycle event changes, flicker, abnormal voltages, power outages, power device parameters, logs, current device status, set up parameters, calibration data, temperature, humidity, pressure, smoke content, security status, transformer temperature, oil level, and status.

39. The computer readable medium of claim 33, further comprising:
   sending an alert if an alert condition occurs in operation of the power device.

40. The computer readable medium of claim 33, further comprising:
   downloading control instructions to a monitoring device.

41. The computer readable medium of claim 33, further comprising:
   providing downloaded control instructions to a connected remote monitoring device.

42. The computer readable medium of claim 33, further comprising:
   sending an alert if an alert condition occurs in operation of the power device.

43. The computer readable medium of claim 33, further comprising:
   storing performance information describing the power condition of the power device.

* * * * *